(12) United States Patent
Hershkowitz et al.

(10) Patent No.: US 9,441,166 B2
(45) Date of Patent: *Sep. 13, 2016

(54) PYROLYSIS REACTOR MATERIALS AND METHODS

(71) Applicant: ExxonMobil Chemical Patents Inc., Baytown, TX (US)

(72) Inventors: Frank Hershkowitz, Basking Ridge, NJ (US); ChangMin Chun, Annandale, NJ (US); Paul F. Keusenkothen, Houston, TX (US); Shiun Ling, Washington, NJ (US); Gary D. Mohr, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/340,653

(22) Filed: Jul. 25, 2014

(65) Prior Publication Data

US 2014/0332445 A1 Nov. 13, 2014

Related U.S. Application Data

(60) Division of application No. 12/772,757, filed on May 3, 2010, now Pat. No. 8,821,806, which is a (Continued)

(51) Int. Cl.
*C01G 9/00* (2006.01)
*C10G 9/00* (2006.01)

(Continued)

(52) U.S. Cl.
CPC ............... *C10G 9/005* (2013.01); *B01J 4/002* (2013.01); *B01J 8/0438* (2013.01); *B01J 8/0442* (2013.01);

(Continued)

(58) Field of Classification Search
CPC .......... C10G 9/005; C10G 9/00; C10G 9/18; C10G 9/26; B01J 8/0438; B01J 8/0492;

(Continued)

(56) References Cited

U.S. PATENT DOCUMENTS 1,064,447 A  6/1913 Cross
1,723,679 A  8/1929 Coberly et al.

(Continued)

FOREIGN PATENT DOCUMENTS

BE  491423  10/1949
CA  306263  12/1930

(Continued)

OTHER PUBLICATIONS

Annaland, M. et al., "A Novel Reverse Flow Reactor Coupling Endothermic and Exothermic Reactions: an Experimental Study," Chemical Engineering Science, 2002, vol. 57, pp. 4967-4985.

(Continued)

*Primary Examiner* — Anthony J Zimmer

(57) ABSTRACT

In one aspect, the invention includes a reactor apparatus for pyrolyzing a hydrocarbon feedstock, the apparatus including: a reactor component comprising a refractory material in oxide form, the refractory material having a melting point of at least 2060° C. and which remains in oxide form when exposed to a gas having an oxygen partial pressure of $10^{-15}$ bar, a carbon partial pressure above the carbon partial pressure of the zirconium carbide and zirconium oxide phase transition at the same temperature, and at temperatures below the temperature of the zirconium triple point at the oxygen partial pressure of $10^{-15}$ bar; and ii) when exposed to a gas having an oxygen partial pressure of $10^{-15}$ bar and at temperatures above the zirconium triple point at the oxygen partial pressure of $10^{-15}$ bar. In some embodiments, the reactor comprises a regenerative pyrolysis reactor apparatus and in other embodiments it includes a reverse flow regenerative reactor apparatus. In other aspects, this invention includes a method for pyrolyzing a hydrocarbon feedstock using a pyrolysis reactor system comprising the step of providing in a heated region of a pyrolysis reactor system for pyrolyzing a hydrocarbon feedstock, apparatus comprising the above refractory material.

6 Claims, 6 Drawing Sheets

Related U.S. Application Data continuation-in-part of application No. 12/576,002, filed on Oct. 8, 2009, now Pat. No. 8,450,552, which is a continuation-in-part of application No. 12/467,832, filed on May 18, 2009, now Pat. No. 8,512,663, application No. 14/340,653, filed on Jul. 25, 2014, which is a continuation-in-part of application No. PCT/US2010/032202, filed on Apr. 23, 2010.

(51) Int. Cl.
| | | |
|---|---|---|
| *C04B 35/486* | (2006.01) | |
| *C04B 35/505* | (2006.01) | |
| *C10G 9/18* | (2006.01) | |
| *C10G 9/26* | (2006.01) | |
| *B01J 4/00* | (2006.01) | |
| *B01J 8/04* | (2006.01) | |
| *B01J 19/24* | (2006.01) | |

(52) U.S. Cl.
CPC ........... *B01J 8/0492* (2013.01); *B01J 19/2485* (2013.01); *C04B 35/486* (2013.01); *C04B 35/505* (2013.01); *C10G 9/00* (2013.01); *C10G 9/18* (2013.01); *C10G 9/26* (2013.01); *B01J 2208/0084* (2013.01); *B01J 2208/00115* (2013.01); *B01J 2208/00309* (2013.01); *B01J 2208/00504* (2013.01); *B01J 2208/00849* (2013.01); *B01J 2219/00081* (2013.01); *B01J 2219/00117* (2013.01); *B01J 2219/00157* (2013.01); *B01J 2219/00159* (2013.01); *C04B 2235/3206* (2013.01); *C04B 2235/3208* (2013.01); *C04B 2235/3217* (2013.01); *C04B 2235/3224* (2013.01); *C04B 2235/3225* (2013.01); *C04B 2235/3227* (2013.01); *C04B 2235/3229* (2013.01); *C04B 2235/3232* (2013.01); *C04B 2235/3239* (2013.01); *C04B 2235/3241* (2013.01); *C04B 2235/3244* (2013.01); *C04B 2235/3246* (2013.01); *C04B 2235/3251* (2013.01); *C04B 2235/3256* (2013.01); *C04B 2235/3258* (2013.01); *C04B 2235/3262* (2013.01); *C04B 2235/3272* (2013.01); *C04B 2235/3275* (2013.01); *C04B 2235/3279* (2013.01); *C04B 2235/3418* (2013.01); *C04B 2235/528* (2013.01); *C04B 2235/5296* (2013.01); *C04B 2235/5436* (2013.01); *C04B 2235/5445* (2013.01); *C04B 2235/5472* (2013.01); *C04B 2235/5481* (2013.01); *C04B 2235/6021* (2013.01); *C04B 2235/658* (2013.01); *C04B 2235/6584* (2013.01); *C04B 2235/72* (2013.01); *C04B 2235/762* (2013.01); *C04B 2235/77* (2013.01); *C04B 2235/96* (2013.01); *C04B 2235/9669* (2013.01); *C04B 2235/9684* (2013.01); *Y02P 20/582* (2015.11)

(58) Field of Classification Search
CPC ..... B01J 8/0442; B01J 4/002; B01J 19/2485; B01J 2219/00157; B01J 2208/00849; B01J 2219/00117; B01J 2219/00081; B01J 2208/0084; B01J 2219/00159; B01J 2208/00309; B01J 2208/00504; B01J 2208/00115; C04B 35/505; C04B 35/486; C04B 2235/3246; C04B 2235/9684; C04B 2235/5481; C04B 2235/5445; C04B 2235/72; C04B 2235/3251; C04B 2235/3225; C04B 2235/3418; C04B 2235/3239; C04B 2235/9669; C04B 2235/3227; C04B 2235/3258; C04B 2235/3275; C04B 2235/3256; C04B 2235/5296; C04B 2235/762; C04B 2235/3244; C04B 2235/6021; C04B 2235/528; C04B 2235/6584; C04B 2235/3217; C04B 2235/3232; C04B 2235/3208; C04B 2235/3229; C04B 2235/77; C04B 2235/96; C04B 2235/3279; C04B 2235/5436; C04B 2235/3224; C04B 2235/3206; C04B 2235/3272; C04B 2235/3262; C04B 2235/3241; C04B 2235/5472; C04B 2235/658
USPC .................. 422/240, 241; 423/608, 263
See application file for complete search history.

(56) References Cited

U.S. PATENT DOCUMENTS

| | | |
|---|---|---|
| 1,843,965 A | 2/1932 | Wulff |
| 1,880,306 A | 10/1932 | Wulff |
| 1,880,307 A | 10/1932 | Wulff |
| 1,880,308 A | 10/1932 | Wulff |
| 1,880,309 A | 10/1932 | Wulff |
| 1,880,310 A | 10/1932 | Wulff |
| 1,917,627 A | 7/1933 | Wulff |
| 1,938,991 A | 12/1933 | Wulff |
| 1,966,185 A | 7/1934 | Preisman |
| 1,966,779 A | 7/1934 | Wulff |
| 1,996,185 A | 4/1935 | Wulff |
| 2,037,056 A | 4/1936 | Wulff |
| 2,080,767 A | 5/1937 | Dreyfus |
| 2,359,759 A | 4/1939 | Hebbard et al. |
| 2,160,170 A | 5/1939 | Martin et al. |
| 2,236,534 A | 4/1941 | Hasche |
| 2,236,555 A | 4/1941 | Wulff |
| 2,319,579 A | 5/1943 | Black |
| 2,319,679 A | 5/1943 | Hasche et al. |
| 2,343,866 A | 3/1944 | Hincke |
| 2,558,861 A | 7/1951 | Liggett |
| 2,580,766 A | 1/1952 | Hall |
| 2,608,594 A | 8/1952 | Robinson |
| 2,645,673 A | 7/1953 | Hasche |
| 2,678,339 A | 5/1954 | Harris |
| 2,692,819 A | 10/1954 | Hasche et al. |
| 2,706,210 A | 4/1955 | Harris |
| 2,718,534 A | 9/1955 | Harris |
| 2,767,233 A | 10/1956 | Mullen, II et al. |
| 2,790,838 A | 4/1957 | Schrader |
| 2,796,951 A | 6/1957 | Bogart |
| 2,813,919 A | 11/1957 | Pearce |
| 2,830,677 A | 4/1958 | Coberly |
| 2,845,335 A | 7/1958 | Hasche |
| 2,851,340 A | 9/1958 | Coberly et al. |
| 2,885,455 A | 5/1959 | Hennig |
| 2,886,615 A | 5/1959 | Lindahl |
| 2,908,733 A | 10/1959 | Sage |
| 2,920,123 A | 1/1960 | Oldershaw et al. |
| 2,921,100 A | 1/1960 | Pettyjohn et al. |
| 2,956,864 A | 10/1960 | Coberly |
| 2,967,205 A | 1/1961 | Coberly |
| 3,024,094 A | 3/1962 | Coberly |
| 3,093,697 A | 6/1963 | Kasbohm et al. |
| 3,156,733 A | 11/1964 | Happel et al. |
| 3,156,734 A | 11/1964 | Happel |
| 3,175,919 A | 3/1965 | Smoot |
| 3,555,685 A | 1/1971 | Loge et al. |
| 3,696,486 A | 10/1972 | Benjamin |
| 3,796,768 A | 3/1974 | Starzenski et al. |
| 3,855,113 A | 12/1974 | Gould |
| 4,119,469 A | 10/1978 | Carbonnel et al. |
| 4,176,045 A | 11/1979 | Leftin et al. |
| 4,200,682 A | 4/1980 | Sederquist |
| 4,240,805 A | 12/1980 | Sederquist |
| 4,256,565 A | 3/1981 | Friedman et al. |
| 4,264,435 A | 4/1981 | Read, Jr. et al. |
| 4,402,746 A | 9/1983 | Ramanarayanan et al. |

(56) References Cited

U.S. PATENT DOCUMENTS

| | | | |
|---|---|---|---|
| 4,461,843 A | 7/1984 | McGarry et al. |
| 4,536,603 A | 8/1985 | Sprouse et al. |
| 4,640,675 A | 2/1987 | Green et al. |
| 4,748,138 A | 5/1988 | Watanabe et al. |
| 4,754,095 A | 6/1988 | Coughenour et al. |
| 4,787,439 A | 11/1988 | Feagin |
| 4,929,789 A | 5/1990 | Gupta et al. |
| 4,973,777 A | 11/1990 | Alagy et al. |
| 5,068,486 A | 11/1991 | Han et al. |
| 5,134,039 A | 7/1992 | Alexander et al. |
| 5,138,113 A | 8/1992 | Juguin et al. |
| 5,206,880 A | 4/1993 | Olsson |
| 5,723,393 A | 3/1998 | Majumdar et al. |
| 5,886,056 A | 3/1999 | Hershkowitz et al. |
| 5,935,489 A | 8/1999 | Hershkowitz et al. |
| 5,976,352 A | 11/1999 | Busson et al. |
| 6,027,635 A | 2/2000 | Busson et al. |
| 6,076,487 A | 6/2000 | Wulff et al. |
| 6,228,293 B1 | 5/2001 | Kriegsmann et al. |
| 6,287,351 B1 | 9/2001 | Wulff et al. |
| 6,322,760 B1 | 11/2001 | Busson et al. |
| 6,365,792 B1 | 4/2002 | Stapf et al. |
| 6,575,147 B2 | 6/2003 | Wulff et al. |
| 6,576,354 B2 | 6/2003 | Tsukatani et al. |
| 6,582,805 B1 | 6/2003 | Mob et al. |
| 6,632,351 B1 | 10/2003 | Ngan et al. |
| 6,830,676 B2 | 12/2004 | Deevi |
| 6,930,066 B2 | 8/2005 | Subramanian |
| 7,049,477 B2 | 5/2006 | Chae et al. |
| 7,220,887 B2 | 5/2007 | Stell et al. |
| 7,288,127 B1 | 10/2007 | Wulff et al. |
| 7,348,287 B2 | 3/2008 | Mechnich |
| 7,482,502 B2 | 1/2009 | Brown et al. |
| 7,491,250 B2 | 2/2009 | Hershkowitz et al. |
| 7,503,948 B2 | 3/2009 | Hershkowitz et al. |
| 7,649,124 B2 | 1/2010 | Lee et al. |
| 7,731,776 B2 | 6/2010 | Chun et al. |
| 7,815,873 B2 | 10/2010 | Sankaranarayanan et al. |
| 7,846,401 B2 | 12/2010 | Hershkowitz et al. |
| 7,914,667 B2 | 3/2011 | Keusenkothen et al. |
| 7,976,797 B2 | 7/2011 | Chun et al. |
| 8,278,231 B2 | 10/2012 | Chun et al. |
| 2002/0020113 A1 | 2/2002 | Kennedy et al. |
| 2003/0105172 A1 | 6/2003 | Bowe et al. |
| 2003/0109372 A1 | 6/2003 | Hasegawa et al. |
| 2004/0147794 A1 | 7/2004 | Brown et al. |
| 2004/0229031 A1 | 11/2004 | Gell et al. |
| 2005/0252446 A1 | 11/2005 | Hoshino et al. |
| 2006/0058184 A1 | 3/2006 | Jiang et al. |
| 2006/0273005 A1 | 12/2006 | Love et al. |
| 2007/0144940 A1 | 6/2007 | Hershkowitz et al. |
| 2007/0191664 A1 | 8/2007 | Hershkowitz et al. |
| 2008/0138630 A1 | 6/2008 | Yasukawa |
| 2008/0274871 A1 | 11/2008 | Hoshino et al. |
| 2008/0300438 A1 | 12/2008 | Keusenkothen et al. |
| 2009/0008292 A1 | 1/2009 | Keusenkothen et al. |
| 2009/0250377 A1 | 10/2009 | Chun et al. |
| 2010/0288617 A1 | 11/2010 | Hershkowitz et al. |
| 2010/0290978 A1 | 11/2010 | Chun et al. |
| 2010/0292522 A1 | 11/2010 | Chun et al. |
| 2010/0292523 A1 | 11/2010 | Hershkowitz et al. |
| 2011/0011768 A1 | 1/2011 | Keusenkothen |

FOREIGN PATENT DOCUMENTS

| | | |
|---|---|---|
| EP | 1386665 | 10/2002 |
| EP | 1386665 | 2/2004 |
| EP | 1600519 | 11/2005 |
| FR | 841410 | 2/1939 |
| FR | 1588738 | 4/1970 |
| GB | 763675 | 12/1956 |
| GB | 830574 | 3/1960 |
| GB | 855764 | 12/1960 |
| GB | 959818 | 6/1964 |
| GB | 972153 | 10/1964 |
| GB | 1064447 | 4/1967 |
| GB | 1149798 | 4/1969 |
| GB | 1199483 | 7/1970 |
| JP | H03-197356 | 8/1991 |
| JP | H04-103670 | 4/1992 |
| JP | 06-128033 | 5/1994 |
| JP | 1998-0090371 | 4/1998 |
| JP | 2003-301123 | 10/2003 |
| JP | 2005-314144 | 11/2005 |
| JP | 2006-124256 | 5/2006 |
| RU | 2249570 | 4/2005 |
| WO | WO 01/70913 | 9/2001 |
| WO | WO 2004/087609 | 10/2004 |
| WO | WO 2007/075945 | 7/2007 |
| WO | WO 2008/150658 | 12/2008 |
| WO | WO 2009/126357 | 10/2009 |

OTHER PUBLICATIONS

Auerkari, Pertti, Mechanical and Physical Properties of Engineering Alumina Ceramics, Technical Research Centre of Finland, 1996, pp. 1-26.

Bartholome, Von E., "*Methods of Energy Addition for Endothermic Gas Reactions at High Temperatures,*" Zeitschrift fuer Elektrochemid and Angewandte Physikalische Chemie, 1953, vol. 57, No. 7, pp. 497-502 (No translation).

Basu, B. et al., "*Microstructure-toughness-wear relationship of tetragonal zirconia ceramics,*" Journal of the European Ceramic Society, Elsevier Ltd., vol. 24, pp. 2031-2040 (2004).

Bixler, G.H. et al. "*Wulff Process Acetylene,*" Journal of Industrial and Engineering Chemistry, Washington, D.C., 45, pp. 2596-2606 (1953).

Bogart, M.J.P. et al., "*Recent Developments in Wulff Acetylene,*" Chemical Engineering Progress, 50, pp. 372-375 (1954).

Bogart, M.J.P. et al., "*The Wulff Process for Acetylene from Hydrocarbons,*" Petroleum Processing, 8, pp. 377-382 (1953).

China and the Japanese Petrochemical Industry, Chemical Economy and Engineering Review, Jul./Aug. 1985, vol. 17, No. 7-8 (No. 190), pp. 47-48.

Crelling et al., "*Coal*" in Ullmann's Encyclopedia of Industrial Chemistry, 2002, Wiley-VCH, available on-line on Apr. 15, 2010. Document retrieved from the Internet <http://www.fischer-tropsch.org/primary documents/gvtreports/ B I O S/1038/b1038 toc.htm>. No date.

Gannon et al. "*Acetylene,*" in Kirk-Othmer Encyclopedia of Chemical Technology, John Wiley, 2003, available on-line Apr. 18, 2003.

Garifzyanova, G.G. et al., "*Pyrolysis of Vacuum Resid by the Plasma Chemical Method,*" Chemistry and Technology of Fuels and Oils, vol. 42, No. 3, pp. 172-175 (2006).

Holmen, A. et al., "*Pyrolysis of natural gas: chemistry and process concepts,*" Fuel Processing Technology, 42, Elsevier Science B.V., pp. 249-267 (1995).

Jennings, R.J.S., "*Organic Chemicals from Natural Gas-I,*" Chemical & Process Engineering, 33, pp. 243-246 (1952).

Kinney, C.R. et al. "*On the Mechanism of Carbonization of Benzene, Acetylene and Diacetylene at 1200° C.,*" Proc. $4^{th}$ Carbon Conference, Pergamon Press, pp. 301-313 (1960).

Lee, S.Y. "*Sintering behavior and mechanical properties of injection-molded zirconia powder,*" Ceramics International, Elsevier Ltd., vol. 30, Issue 4, pp. 579-584 (2004). Abstract retrieved from the Internet:< URL: http://www.sciencedirect.com/science> on May 1, 2008.

Moskovits, M. et al, "*Sintering of bimodal Y2O3-stabilized zirconia powder mixtures with a nanocrystalline component,*" Nanostructured Materials, Elsevier Science Ltd., vol. 11, Issue 2, pp. 179-185 (1999). Retrieved from the Internet: <http://www.sciencedirect.com/science> on Jul. 23, 2008.

Nait-Ali, B. et al., "*Thermal conductivity of highly porous zirconia,*" Journal of the European Ceramic Society, Elsevier Ltd., vol. 26, Issue 16, pp. 3567-3574 (2006). Retrieved from the Internet<URL:http://www.sciencedirect.com/science> on May 1, 2008.

(56) References Cited

OTHER PUBLICATIONS

Ovid'Ko, I.A. et al., "*Plastic Deformation and Fracture Processes in Metallic and Ceramic Nanomaterials with Bimodal Structures,*" Rev. Adv. Mater. Sci. vol. 16 pp. 1-9 (2007).

Pertti Auerkari, "*Mechanical and Physical Properties of Engineering Alumina Ceramics,*" Technical Research Centre of Finland (1996), pp. 1-26.

Ries, H.C., "*Acetylene,*" Process Economics Program, Stanford Research Institute, Report No. 16, Menlo Park, CA, Sep. 1966, pp. 1-403.

Sherwood, Von Peter W., "*Acetylene from Natural Gas and Petroleum,*" Erdol and Kohle, 1954, vol. 7, No. 18, pp. 819-822.

Sneddon, R., "*Successful Acetylene Synthesis,*" The Petroleum Engineer, 26, pp. C5-C8 (1954).

Swamy, et al., "*High-temperature powder x-ray diffraction of yttria to melting point,*" J. Mater. Res. vol. 14 No. 2 (Feb. 1999), pp. 456-459.

Thiele et al., "*Deposition and properties of yttria-stabilized zirconia thin films using reactive direct current cagnetron sputtering,*" :J. Vac. Sci. Technol. A., vol. 9, Issue 6 (1991), pp. 3054-3060.

Vaβben, R. et al., "*Toughening of sic ceramics by a bimodal grain size distribution produced by hiding ultrafine and coarse grained SiC powers,*" Nanostructured Materials, Elsevier, vol. 6, No. 5, pp. 889-892(4) (1995). Retrieved from the Internet<URL:http://www.ingentaconnect.com> on May 1, 2008.

Weaver, T. "*Economics of Acetylene by Wulff Process,*" Processing Engineering, Chemical Chemical Engineering Progress. 49, pp. 35-39 (1953).

Wei et al., "*Processing Character of MgO-Partially Stablilized Zirconia (PSZ) in Size Grading Prepared by Injection Molding,*" Journal of the European Ceramic Society, vol. 18, pp. 2107-2116 (1998).

Wen-Cheng et al., "*Mechanical and Thermal Shock Properties of size Graded MgO—PSZ Refactory,*" Journal of the European Ceramic Society, vol. 20, pp. 1159-1167, Jan. 1, 2000.

Wysiekierski et al., "*Control Coking for Olefins Plants,*" Hydrocarbon Processing, vol. 78, No. 1 (1999), pp. 97-100.

Zender et al., ZrO2 Materials for Application in the Ceramics Industry.

PYROLYSIS REACTOR MATERIALS AND METHODS

CROSS-REFERENCE TO RELATED APPLICATIONS

This application is a divisional application of U.S. Non-Provisional application Ser. No. 12/772,757, filed May 3, 2010, now allowed, entitled "Pyrolysis Reactor Materials and Methods", which is a continuation-in-part application to U.S. Non-Provisional application Ser. No. 12/576,002, filed Oct. 8, 2009, now U.S. Pat. No. 8,450,552, granted May 28, 2013, entitled "Pyrolysis Reactor Materials and Methods," which is a continuation-in-part application to Ser. No. 12/467,832, filed May 18, 2009, now U.S. Pat. No. 8,512,663, granted Aug. 20, 2013, entitled "Pyrolysis Reactor Materials and Methods", the entireties of which are incorporated by reference herein. This application is also a continuation-in-part to PCT/US2010/032202, filed Apr. 23, 2010, entitled "Pyrolysis Reactor Materials and Methods", which claims priority to and the benefit of U.S. Ser. No. 12/467,832, filed May 18, 2009, now U.S. Pat. No. 8,512,663, granted Aug. 20, 2013, the entireties of which are incorporated herein by reference.

FIELD OF THE INVENTION

This invention pertains to advanced materials, methods, and apparatus useful in regenerative pyrolysis reactors such as may be used for pyrolyzing or cracking hydrocarbons. In one non-limiting example, the invention relates to advanced refractory and ceramic materials, apparatus, and methods suitable for use in cracking hydrocarbon feedstocks in a high-severity, regenerative pyrolysis reactor. Particularly, the invention relates to coking and carbide penetration resistant and carbide corrosion resistant pyrolysis reactor apparatus and pyrolysis methods using the same.

BACKGROUND OF THE INVENTION

Economical operation of high severity hydrocarbon cracking processes and equipment requires overcoming numerous competing operational and engineering challenges. The high temperatures and process stresses can exceed the long term viability of most conventional apparatus, including conventional refractory ceramics. In addition to component physical and thermal performance considerations, component chemical inertness and crystalline stability also are significant considerations. Pyrolysis temperatures combined with the presence of carbon from the hydrocarbon feedstock and potential presence of oxygen present special ceramic-metallurgical challenges to avoid premature ceramic corrosion.

Conventional steam crackers are a common tool for cracking volatile hydrocarbons, such as ethane, propane, naphtha, and gas oil. Other higher severity thermal or pyrolysis reactors are also useful for cracking hydrocarbons and/or executing thermal processes, including some processes conducted at temperatures higher than can suitably be performed in conventional steam crackers. Compared to conventional cracking equipment and processes, higher temperature reactions (e.g., >1500° C.) and processes typically require more complex, costly, and specialized equipment to tolerate the intense heat and physical stress conditions. Properties such as melt temperature, reaction environment non-inertness, component strength, and toughness limitations commonly define limits for many processes.

In addition to physical temperature limitations for reactor materials, many prior art ceramic reactor materials that are relatively inert at lower temperatures become susceptible to chemical degradation, ceramic corrosion, and/or crystalline alteration at higher temperatures, leading to premature degradation and/or process interference such as by generation of unacceptable levels of contaminants in the process. Although high temperature regenerative pyrolysis reactors are generally known in the art as capable of converting or cracking hydrocarbons, they have not achieved widespread commercial use, due significantly to the fact that they have not been successfully scaled to a commercially economical size or useful life span as compared to less severe alternatives, such as steam cracking.

For example, the "Wulff" process represents one of the more prominent prior art processes for generation of acetylene. Wulff discloses a cyclic, regenerative furnace, preferably including stacks of Hasche tiles (see U.S. Pat. No. 2,319,679) as the heat exchange medium. However, such materials have demonstrated insufficient strength, toughness, and/or chemical inertness, and are not amenable to use as certain desirable reactor components, such as for use as reactor fluid conduits, to facilitate large-scale commercialization. Prior art regenerative pyrolysis reactor systems have typically used alumina as the bed packing material. The commercial embodiments of these reactor systems did not operate at temperatures sufficient to achieve high conversion of methane feed. One reason for this is that pure alumina has a melting point of 2050° C. and practical alumina will have lower melting point due to the effect of impurities. Maximum practical use temperatures are typically two- to three-hundred degrees lower than the actual melting temperature, which combined with decreases due to impurities, renders alumina unsuitable for use in a high temperature (e.g., >1500° C., or >1600° C., or up to 2000° C.) pyrolysis reactor. Although some of the "Wulff" art disclose use of various refractory materials, a commercially useful process for methane cracking or other extreme high-temperature processes has not previously been achieved utilizing such materials. The aforementioned practical obstacles have impeded large scale implementation of the technologies. Materials availability for high temperature, high-stress applications is one of the most critical issues in design and operation of large-scale, commercial, high-productivity, thermal reactors.

While many ceramics tend to be somewhat inert or chemically stable at moderately elevated temperatures, many ceramics become chemically and/or structurally unstable at high temperatures, tending to volatize, change chemical phases, carburize, degrade, and/or corrode within undesirably short periods of time. Exemplary chemically and/or thermally unstable ceramics include but are not limited to certain silicas, aluminas, borides, carbides, and nitrides. Many of such ceramics are also known to undergo alterations in crystalline structure at elevated temperatures and/or across relevant process temperature ranges. Such alterations can also result in changes in volume resulting in creation of stress fractures which in turn may reduce the material's strength or thermal performance properties.

For example, zirconia is a crystalline material that is commonly used in certain refractory ceramics. However, zirconia undergoes a crystalline change between moderately high temperatures and severely high temperatures in the way its atoms are stacked (polymorphic transformation). Zirconia has a monoclinic crystal structure between room temperature and about 1200° C. Above about 1200° C., zirconia converts to a tetragonal crystal structure. At a still higher temperature, such as above 2370° C., zirconia changes from tetragonal to cubic structure and melts at 2715° C. These transformations are accompanied by volumetric shrinkage and expansion between the crystalline states, resulting in fractures or cleavages along grain boundaries. In polycrystalline zirconia, this tetragonal-monoclinic transition and cleaving results in a progressive reduction in strength and potential failure. Stabilizers, such as yttria ($Y_2O_3$) and some other metal oxides can sometimes be incorporated within the crystal structure to arrest or prevent the crystalline shifts, rending the crystal structure more stable across a broader temperature spectrum. However, such incorporation may not be sufficient to prevent undesirable thermodynamic alterations, such as from the oxide phase to a carbide phase.

It has been learned that certain stabilizers are more volatile and susceptible to progressive high temperature loss than other stabilizers. More volatile stabilizers are frequently less desirable than more loss-resistant stabilizers. For example, calcia (CaO) and magnesia (MgO) stabilizers are capable of providing a stabilized ceramic that initially achieves many of the desirable performance properties, but over time calcia and magnesia stabilizers may be more susceptible to loss than other less volatile stabilizers.

A similar, recently recognized problem particular to high temperature hydrocarbon pyrolysis pertains to carburization within the ceramic component, which can produce carbide-oxide conversion chemistry in the ceramic zirconia oxide that also leads to progressive component degradation, herein considered a type of "ceramic corrosion." This high temperature hydrocarbon-related corrosion mechanism was not previously identified, understood, or recognized as a concern with high temperature hydrocarbon pyrolysis using ceramics. Carburization is a heat activated process in which a material, such as a ceramic or metal, is heated to temperature below its melting point, in the presence of another material that liberates carbon as it thermally decomposes, such as hydrocarbons. The liberated carbon can permeate the exposed surface and near-surface interior of the ceramic crystal matrix and either remains in spatial regions as coke or at more elevated temperatures react with the ceramic to form ceramic carbides. Such permeation by carbon can over time adversely affect the mechanical and chemical properties of the ceramic material such as are otherwise needed for long-term use in commercial, hydrocarbon pyrolysis reactors. Ceramic component volatility and progressive loss due to the severe temperatures and cyclic temperature swings also may contribute to carburization. Issues include carbon infiltration and coking within the ceramic matrix pores and an associated, undesirable carbide-oxide interaction chemistry resulting in progressive corrosion and degradation of the ceramic matrix, including micro-fractures due to coke expansion. Such problems are of particular interest in high severity pyrolysis of hydrocarbon feedstocks (e.g., >1500° C.).

The pyrolysis art needs a ceramic composition that resists or avoids carbon permeation, carburization, and/or oxide-carbide corrosion. The desired materials should concurrently provide and maintain the needed structural integrity, crystalline stability, relatively high heat transfer capability, and chemical inertness required for large scale, commercial applications, particularly with respect to hydrocarbon pyrolysis.

SUMMARY OF THE INVENTION

The present invention relates to thermal pyrolysis of hydrocarbon feedstocks and in one aspect includes inventive materials for useful in pyrolyzing hydrocarbon feedstock in a pyrolysis reactor, preferably in some embodiments a regenerative pyrolysis reactor, and in still other embodiments a reverse flow type regenerative reactor. The inventive apparatus is resistant to carbon deposition, carbide-oxide interactions, and associated ceramic corrosion and component degradation. In another aspect, the invention provides a stabilized zirconia refractory ceramic that is resistant to loss of stabilizer and resistant to shifts in crystalline structure across a broad temperature range. The disclosed stabilized zirconia ceramic resists carbide-oxide interaction corrosion, thereby resisting progressive performance degradation due to ceramic corrosion. In one embodiment, the invention includes a carbide-oxide corrosion resistant regenerative pyrolysis reactor apparatus useful for pyrolyzing a hydrocarbon feedstock at temperatures of no less than 1200° C. and sometimes of no less than 1500° C., or in some embodiments no less than 2000° C.

In some embodiments, the present invention relates to a reactor apparatus for pyrolyzing a hydrocarbon feedstock, the apparatus including: a reactor component comprising a refractory material in oxide form, the refractory material having a melting point of no less than 2060° C. and which remains in oxide form for at least one of i) when exposed to a gas having an oxygen partial pressure of $10^{-15}$ bar, a carbon partial pressure above the carbon partial pressure of the zirconium carbide and zirconium oxide phase transition at the same temperature, and at temperatures below the temperature of the zirconium triple point at the oxygen partial pressure of $10^{-15}$ bar; and ii) when exposed to a gas having an oxygen partial pressure of $10^{-15}$ bar and at temperatures above the zirconium triple point at the oxygen partial pressure of $10^{-15}$ bar.

In other embodiments, the invention includes a reactor apparatus for pyrolyzing a hydrocarbon feedstock, the apparatus including: a reactor component comprising a refractory material in oxide form, the refractory material having a melting point of not less than 2060° C. and which remains in oxide form when exposed to a gas having carbon partial pressure of $10^{-11}$ bar ($1 \times 10^{-11}$), an oxygen partial pressure of $10^{-15}$ bar, at a temperature of 2050° C. In other many embodiments, the reactor apparatus comprises a regenerative pyrolysis reactor apparatus. In various other embodiments, the regenerative pyrolysis reactor comprises a reverse flow regenerative reactor apparatus. Many reactor embodiments utilize a deferred combustion process to heat the reactor. In many embodiments, the refractory material has a melting point of not less than 2010° C., and in other embodiments not less than 2160° C.

In other aspects, the invention includes a regenerative, refractory corrosion resistant, pyrolysis reactor system for pyrolyzing a hydrocarbon feedstock comprising a first reactor and a second reactor in flow communication with the first reactor, at least one of the first reactor and the second reactor comprising a refractory material in oxide form, the refractory material having a melting point of no less than 2060° C. and remains in oxide form when exposed to a gas mixture having a carbon partial pressure of $10^{-11}$ bar, at a reference oxygen partial pressure of $10^{-15}$ bar, and at a temperature of 2050° C.

In still other aspects, the inventions include a method for mitigating carbide-oxide ceramic corrosion of a refractory material in the presence of a pyrolyzed hydrocarbon feedstock, the method comprising the steps of providing in a heated region of a pyrolysis reactor system for pyrolyzing a hydrocarbon feedstock, apparatus comprising a refractory material in oxide form, the refractory material having a melting point of no less than 2060° C. and that remains in oxide form when exposed to a gas having carbon partial pressure of $10^{-11}$ bar, an oxygen partial pressure of $10^{-15}$ bar, at a temperature of 2050° C. In other embodiments, the invention includes apparatus wherein the vapor pressure of the refractory material is no greater than $10^{-7}$ bar at 2000° C.

Various other aspects of the invention include a method for pyrolyzing a hydrocarbon feedstock using a pyrolysis reactor system comprising the steps of: (a) providing in a heated region of a pyrolysis reactor system for pyrolyzing a hydrocarbon feedstock, apparatus comprising a refractory material in the oxide form, the refractory material having a melting point of no less than 2060° C. and that remains in the oxide form when exposed to a gas having a carbon partial pressure of $10^{-11}$ bar, an oxygen partial pressure of $10^{-15}$ bar, at a temperature of 2050° C.; (b) heating the heated region to a temperature of no less than 1200° C., or sometimes no less than 1500° C.; (c) introducing a hydrocarbon feedstock into the heated region; and (d) pyrolyzing the hydrocarbon feedstock using heat from the heated region.

In some embodiments, the invention may include a refractory material comprising an yttria stabilized ceramic and including at least 21 wt. % yttria based upon the total weight of the refractory material. However, depending upon the carbon concentration and partial pressure, the longevity of such embodiments having an yttria concentration of less than 50 wt % may be unacceptably short for some applications. In other embodiments, the refractory material may consist essentially of ceramic material (e.g., zirconia) and yttria, notwithstanding the minor presence of other additives such as manufacturing and processing additives. In many applications, the inventive material may be suitable for use in a pyrolysis reactor used for pyrolyzing a hydrocarbon feedstock. In many embodiments, the refractory material may also have porosity of from 2 to 28 vol. %, or from 5 to 28 vol. %, based upon the volume of the refractory material. In some aspects of the invention, the refractory material comprises a monomodal or normal grain size distribution, while in other embodiments the refractory material comprises a multimodal grain distribution.

In still other embodiments, the step (a) of providing the refractory material comprises providing a refractory material comprising at least 50 wt. % yttria, or at least 80 wt. % yttria, or at least 90 wt. % yttria, or substantially all yttria, based upon the total weight of the refractory material. Weight percents of yttria include the weight percent of pure yttrium and/or compounds comprising yttrium therein, such as yttria oxide, that otherwise meet the additional requirements of the invention, such as thermodynamic phase stability, and melting temperature. Yttria is merely one exemplary suitable compound.

DETAILED DESCRIPTION

Figure 1A:
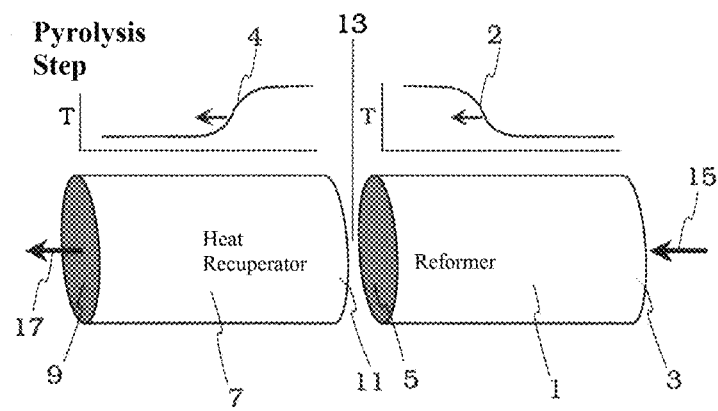
FIGS. 1(a) and 1(b) are a simplified, diagrammatic illustration of the two primary process steps in a regenerating reverse flow pyrolysis reactor system, according to exemplary applications of the present invention.

The present invention relates to advanced refractory type ceramics and uses for the same. In various aspects, the invention includes materials, components, apparatus, and processes having particular application for use with pyrolysis reactors and processes for performing high temperature (e.g., >1500° C.) chemistry, conversions, cracking, and/or thermal alteration of feeds such as but not limited to hydrocarbon feeds. The inventive aspects include but are not limited to ceramic components and apparatus using the same that have improved high temperature stability, prolonged component life expectancy, and/or sustained performance properties that may exceed the life expectancy of one or more of such properties as compared to previously known ceramics. The term "pyrolysis" as used herein may be defined to include substantially any use of heat or thermal energy, whether produced or used directly, such as by flame-fired furnace, or indirectly such as by exothermic reactions, combustion, or heat transfer from a heated media, to cause the molecular conversion, reaction, reforming, degrading, or cracking of a hydrocarbon feedstock into an intermediate or product stream, and may optionally include supplementation by one or more other processes, such as but not limited to catalysis, hydrogenation, esterification, oxidation, reduction, etc., and optionally with diluents, solvents, etc., and/or stripping agents.

The present invention provides ceramic or refractory material compositions that are resistive to or avoid carburization and ceramic corrosion problems. The inventive materials also maintain crystalline stability and can endure prolonged exposure to high temperatures, substantial temperature swing cycles, and stress cycles due to cyclic flow of feedstocks and reaction materials. The inventive aspects may have particular utility that facilitates enhanced large-scale commercialization of high temperature pyrolysis processes. Exemplary suitable processes may include but are not limited to high-temperature pyrolysis reactor conversion of methane or other hydrocarbon feed, such crude or coal to acetylene or olefins, coal gasification processes, syn-gas processes, steam crackers, etc. Exemplary apparatus may include but are not limited to pyrolysis reactors, reverse flow reactors, regenerative reactors. Other exemplary reactors may include bur are not limited to deferred combustion reactors, gasification reactors, syngas reactors, and steam cracking reactors and furnaces. Other exemplary inventive components may include but are not limited to reactor components and apparatus that feature engineered or otherwise particularly designed shapes, functions, configurations, intricacies, or irregular geometries that benefit from improved mechanical strength and thermal shock resistance at high temperatures (e.g., >1500° C.). Such improvements may also lead to improved processes related thereto.

In one aspect, the present invention provides a stabilized ceramic composition that is particularly resistive to carburization, thermodynamic chemical alteration, progressive loss of stabilizer, carbon permeation, and carbide-oxide ceramic corrosion, thereby preserving the crystalline structural under exposure to high temperature and/or highly reactive environments. Exemplary properties benefiting from the corrosion resistance and preserved intra-granular stabilization may include certain performance properties such as but not limited to flexural strength or modulus of rupture (MOR), normalized thermal shock resistance, and chemical stability at high temperature, as compared to such collective properties of previous art. Such improvements may facilitate large scale commercialization of processes and apparatus that were previously technically and/or economically disadvantaged due to unacceptable component life.

In one form, the inventive materials include a stabilized zirconia ceramic material, stabilized primarily by yttria (includes $Y_2O_3$ and/or an yttrium-containing compound), although other stabilizing compounds or elements may also be present in concentrations that are secondary to the yttria concentration. Yttria is present in an amount of at least 21 wt. % and in many embodiments at least 25 wt. %, and in many other embodiments at least 28 wt %, or at least 30 wt. % yttria, based upon the total weight of the stabilized zirconia composition present. In many embodiments, at least a portion of the zirconia is fully stabilized and in other embodiments substantially all of the zirconia present is fully stabilized. Generally, fully stabilized zirconia may be preferred in order to avoid detrimental risk of progressive loss of stabilizer and progressive carbide-oxide ceramic corrosion. Additional material pertaining to the zirconia and stabilized zirconia embodiments are found within the parent patent application, U.S. Ser. No. 12/467,832, filed 18 May, 2009, titled "Pyrolysis Reactor Materials and Methods."

The present invention provides a refractory material suitable for use in a pyrolysis reactor apparatus for pyrolyzing hydrocarbon feedstocks at temperatures in excess of 1500° C. that are resistive to or avoid carburization and ceramic corrosion in active, carbon-rich, environments. To achieve the desired function of avoiding the detrimental effects of carburization and carbide-oxide ceramic corrosion, the ceramic compositions according to this invention utilize a thermodynamically stable oxide having an appropriately high melting point, such as for example, an oxide of yttrium (yttria). In some high temperature, carbon-rich pyrolysis environments, a fully stabilized zirconia (e.g., at least 14 wt. % or at least 18 wt. % or at least 21 wt. %, of stabilizer) may not sufficiently achieve the objective of preventing carburization and ceramic corrosion for an acceptable duration of commercial use. A further incremental amount of oxide-stable, refractory material is needed to achieve such objective. The present inventive materials comprise at least 50 wt. % of a thermodynamically stable oxide material, (e.g., such as but not limited to yttria), and many embodiments comprise at least 80 wt. % of such material, and still other embodiments comprise at least 90 wt. % of such material, while still other embodiments are comprised of substantially all, or even consist substantially of such stable oxide material.

The newly identified problem process of so-called carbide-oxide corrosion describes effects observed during transition of zirconia compound from an oxide to a carbide and then sometimes back to an oxide, with associated undesirable precipitation of carbon and associated undesirable changes in morphological and crystal structure. Such structural changes may also precipitate micro-fractures that lead to structural weakening and provide increased pathways for still further carbon permeation and corrosion. For example, at high temperatures (e.g., >1500° C.) and high carbon partial pressure, zirconium oxide ($ZrO_2$) may be reduced to zirconium carbide (ZrC) when in contact with solid carbon or in carbon-containing gases, through zirconium oxycarbide $Zr(C_xO_y)$ as an intermediate phase. When ZrC is exposed to moderately high temperatures (>500° C.) in an oxidizing atmosphere that contains oxygen-containing gases, ZrC converts back to $ZrO_2$ through $Zr(C_xO_y)$ as an intermediate phase. The atomic oxygen displaces carbon in the interstitial vacancies of the ZrC crystal lattice, forming the intermediate, $Zr(C_xO_y)$. Continuing oxidation of $Zr(C_xO_y)$ leads to carbon precipitation at the $ZrC/ZrO_2$ interface. Such retention of carbon with the oxidation of ZrC triggers further deposition and buildup of carbon from the process stream, further exacerbating the cyclic oxide-carbide-oxide transition problem and increasing porosity. The altered crystal structure suffers degradation in mechanical strength and thermal shock resistance.

The term oxide, as uses herein without additional specification, is taken to mean one or more elements that are molecularly combined with primarily oxygen, and specifically not primarily combined with carbon. The term carbide, as uses herein without additional specification, is taken to mean one or more elements that are molecularly combined with carbon, but which may also include molecular combination with oxygen. Thus, materials such as zirconium oxycarbide $Zr(C_xO_y)$ are generally considered to carbides for the purposes of this application. Specifically, oxides, unless indicated otherwise in the present invention are refractory materials that have less than about 10 mole percent carbon, more preferably less than 5 mole percent carbon and even more preferably less than 1 mole percent carbon. Carbides, unless indicated otherwise in the present invention, are refractory materials that have greater than about 10 mole percent carbon.

Further explaining the problem, in the reverse-flow reactor conditions, materials are subjected to myriads of cycles of oxidizing/carburizing gases. Under these conditions, zirconia has been observed to gradually change its morphological appearance leading to "raspberry-like" grain morphology. The raspberry-like grain structure is an observable sign of carbide-oxide ceramic corrosion and can be determined by scanning electron microscopic (SEM) examination of the tested material. The raspberry-like grain structure is believed caused by the cyclic transitions and leads to increased surface area, which in turn leads to still further build-up of carbon, which in turn leads to still further cyclic corrosion transitions. Once the corrosion initiates, the process can accelerate until the effect causes an unacceptable level of material degradation.

In one aspect, the present invention includes a reactor apparatus for pyrolyzing a hydrocarbon feedstock, the apparatus including: a reactor component comprising a refractory material in oxide form, the refractory material having a melting point of not less than 2060° C. and which remains in oxide form when exposed to a gas having carbon partial pressure of $10^{-11}$ bar ($1\times10^{-11}$), an oxygen partial pressure of $10^{-15}$ bar, at a temperature of 2050° C. In other many embodiments, the reactor apparatus comprises a regenerative pyrolysis reactor apparatus. In various other embodiments, the regenerative pyrolysis reactor comprises a reverse flow regenerative reactor apparatus. Many reactor embodiments may utilize a deferred combustion process to heat the reactor. In many embodiments, the refractory material has a melting point of not less than 2010° C., and in still other embodiments not less than 2160° C. The gas used to determine the partial pressures of the carbon and oxygen is a reference gas (or gas mixture) that at the stated temperature includes both carbon and oxygen species. Substantially any gas that at such temperature comprises the stated carbon and oxygen partial pressures may be used to determine the oxide stability. In many aspects, the reference gas may be a laboratory gas sample that is specified to have a carbon partial pressure of, for example $10^{-11}$ bar, (measured by any test method or known physical property) and an oxygen partial pressure of, for example $10^{-15}$ bar, at 2050° C. When a ceramic or refractory material sample is exposed to this reference gas, the sample material remains in oxide form. Materials meeting such requirements, in conjunction with the requisite melting point, may be acceptable according to the present invention, for preventing carburization and/or ceramic corrosion.

In other embodiments, the refractory material remains in oxide form when exposed to a gas having a carbon partial pressure of $10^{-10}$ bar, an oxygen partial pressure of $10^{-15}$ bar, and at a temperature over the full range of from 1800° C. to 2100° C.

The refractory material of the present invention overcomes the afore-stated challenges. Unlike $ZrO_2$, it has been learned that more thermodynamically stable oxides can avoid the carbide-oxide phase shift problems. For example, yttrium oxide or yttria ($Y_2O_3$) is thermodynamically stable in the presence of carbon-containing gases and does not form yttria carbide (YC). The undesirable compound yttrium carbide (YC) is formed from metallic yttrium (Y), not from $Y_2O_3$. Since the stable oxide form, (e.g., $Y_2O_3$) is relatively inert (e.g., thermodynamically stable) to carbon or carbon-containing gases as compared to zirconia, the more stable oxide form (e.g., $Y_2O_3$) appears to suppress detrimental transition from carbide to oxide. Surprisingly, it has been learned that at sufficient level of the stable ceramic oxide (whether yttria or another suitable ceramic oxide) the carbide-oxide corrosion mechanism can be inhibited or even prevented. In many embodiments, the preferred concentration of stable oxide is determined to be at least 50 wt. %, based upon the total weight of the ceramic material. Other suitable and sometimes more preferably levels of the stable oxide form may be at least 70 wt. %, 80 wt. %, 90 wt. %, 95 wt. %, 99 wt. %, substantially 100%, or 100 wt. %, including mixtures of such suitable oxides at such wt. % levels. The mechanism by which the stable oxides work is still not wholly understood and is subject to some speculation and uncertainty, but the inventive methods and material formulations have been determined successful at inhibiting or avoiding carburization and the carbide-oxide corrosion mechanism.

In addition high concentrations of suitable oxides, such as yttria, high concentrations of calcia (CaO), magnesia (MgO), and/or ceria ($CeO_2$) might also offer some limited resistance against such corrosion. However, it has also been learned that for many high temperature hydrocarbon applications, calcia and magnesia stabilizers are more volatile than yttria and are therefore potentially of less value as either a stabilizing oxide component than yttria, although the presence of such other stabilizers materials within the composition is not precluded. In many embodiments, the stable oxide refractory materials have a vapor pressure that is less than $10^{-7}$ bar at 2000° C. Further, it has also been learned that in addition to thermodynamic stability, suitable oxides should have a melting point of not less than 2060° C. for practical application for long periods of time at pyrolysis temperatures in excess of 1500° C. and up to 2000° C. Suitable oxides may also preferably have melting temperature of not less than 2110° C., or 2160° C., or preferably not less than 2300° C.

In some embodiments, the refractory material may further comprise one or more "secondary oxides" selected from the group consisting of Al, Si, Mg, Ca, Y, Fe, Mn, Ni, Co, Cr, Ti, Hf, V, Nb, Ta, Mo, W, Sc, La, and Ce, and mixtures thereof. The secondary oxides may be merely incidentally present, such as impurities or via contamination or as a result of the sintering, annealing, or other manufacturing process. The secondary oxides may also be purposefully added, such as to improve certain properties or uses, e.g., such as processability during manufacture; or may be generated and deposited as a bi-product from the thermal process and other materials present. The amount of secondary oxides in the stabilized zirconia formed component may typically range from virtually none present, up to 5 wt. %, or from 0.001 wt. % present up to 10 wt. %, or in some embodiments from 0.01 wt. % to 5 wt. %, or typically in still other embodiments from 0.1 to 3 wt. %, based on the weight of the formed stabilized zirconia component.

According to the present inventions, there are two features of a material that should be satisfied to avoid carburization of ceramic materials during high temperature pyrolysis of hydrocarbon feedstocks. First, the material should have a high melting point. Second, the material should have a thermodynamic preference to remain in the oxide form when exposed to a pyrolysis gas mixture having high carbon activity.

Satisfactory refractory materials for a high-temperature regenerative pyrolysis reactor should have a melting point that is higher than that of pure alumina (2050° C.), which was a preferred material under much of the prior art. Due to impurities and practical use limitations, alumina was not suitable for commercial pyrolysis at temperatures above 1500° C. Satisfactory materials for use in the high temperature zone of the reactor have a melting point no less than 2060° C. More preferred materials have a melting point above 2110° C., and even more preferred to have a melting point above 2160° C.

Another feature that defines a refractory material's ability to resist carburization and carbide-oxide corrosion is the degree to which the oxide form of the material is stable under the pyrolysis conditions. Materials whose oxide form is stable under all pyrolysis conditions are found to be free of carbide-oxide corrosion. A non-limiting exemplary material is pure Yttria. Materials whose oxide form is stable under most pyrolysis conditions are found to be resistant to carbide-oxide corrosion. High-yttria zirconias fall into this category. A non-limiting example is high yttria zirconias, such as greater than 21 wt. % yttria, or greater than 28 wt. % yttria, or greater than 40 wt. % yttria, or greater than 50 wt. % yttria, or greater than 70 wt. %, or 80 wt. %, or 90 wt. % or substantially all yttria. Materials that have stable carbide forms under a large portion of the pyrolysis conditions may be subject to unacceptably rapid carburization and carbide-oxide corrosion and thus may not be suitable for use in high-temperature zones of hydrocarbon pyrolysis reactors. For non-limiting example, unstabilized and low-yttria zirconias (e.g., <11.4 wt. % yttria) fall into this category. A detailed description of thermodynamic stability follows below.

Phase stability diagrams were generated by calculating the boundaries between ranges of stable solid species. These boundaries are plotted as functions of environmental variables such as the activities or partial pressures of oxygen and carbon species. Here, the term "activity" refers to the effective concentration of a species in a mixture. For carbon, the species C may not normally be thought of or measured as a gas phase species, but its gas phase concentration (or gas-law "activity") in a hydrocarbon mixture can be calculated in relation to other gas phase (e.g. hydrocarbon)

species via thermodynamic equilibrium procedures. This gas phase carbon (as C) activity (or partial pressure) is used herein to define the environment of stability for oxides and carbides of refractory materials. The term "partial pressure" is the effective fraction of the total pressure due to a gaseous species in a gas mixture. Stated differently, in a mixture of gases, a single gas's partial pressure therein is the pressure that such gas would have if it alone occupied the volume. It is noted that partial pressure numerically approximates the activity for a gaseous species. While the actual diagrams were generated using a commercial software known as HSC Chemistry [Version. 5.11, Outokumpu Research Oy, Finland (2002)], the underlying calculations can be done by a person skilled in the art of thermodynamics. This type of calculation involves recording a mass action equation that describes the equilibrium between two solid species plus the environmental species. The activities of these two solid species are then set to one to indicate their co-existence, and the mass action equation is converted into an algebraic equation that mathematically defines the range boundary between these two solid species as a function of environmental variables such as carbon partial pressure or oxygen partial pressure. Similar calculations can then be repeated for all pairs of solid phases to map phase stability diagrams.

Figure 4:
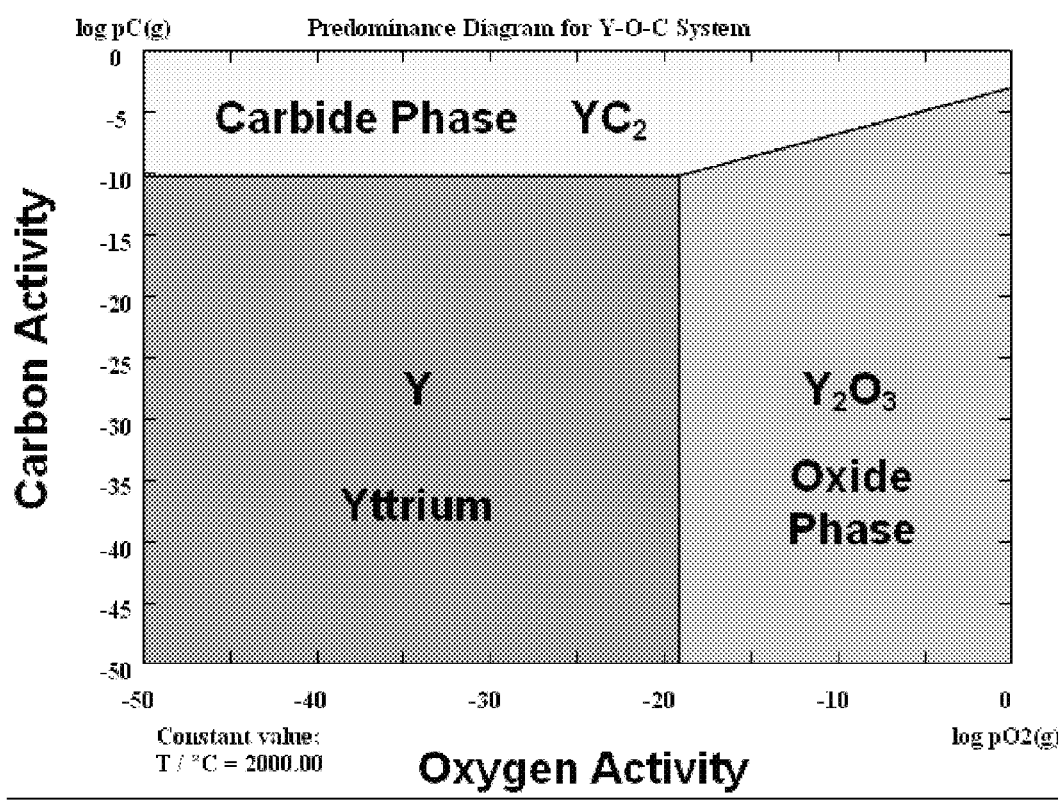
FIG. 4 provides an exemplary phase stability diagram for and yttrium-oxygen-carbon system at 2000° C.
Figure 5:
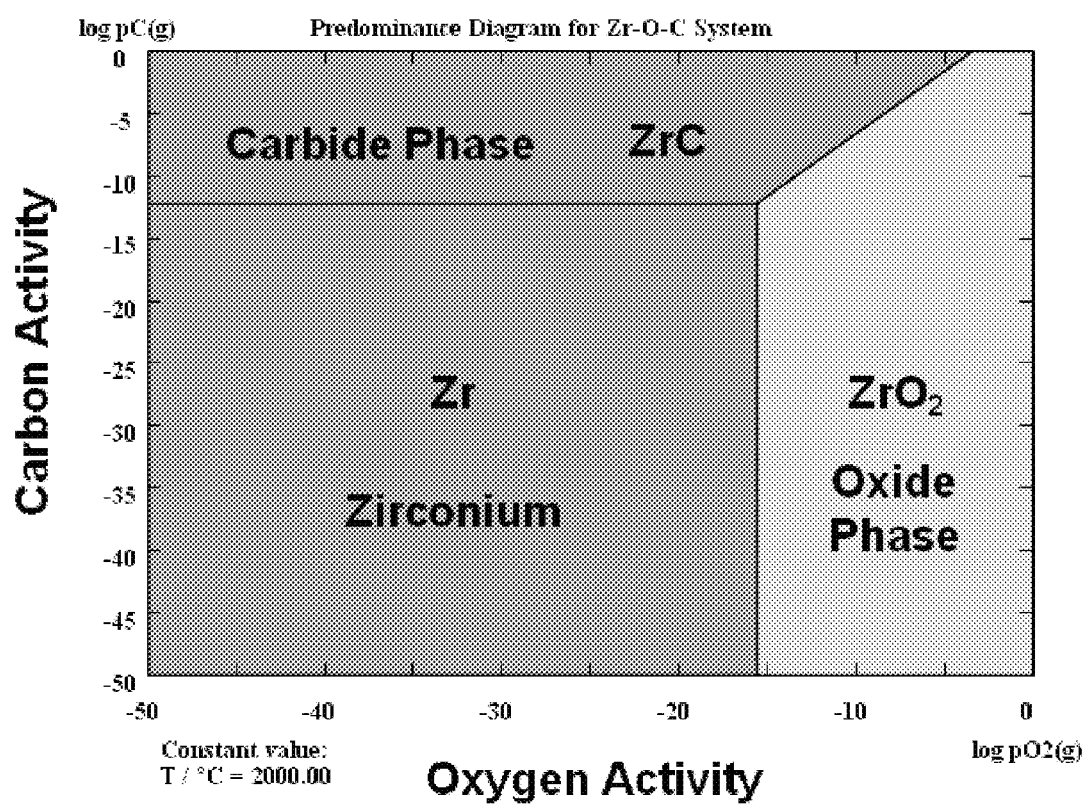
FIG. 5 provides an illustration of a phase stability diagram for a zirconium-oxygen-carbon system at 2000° C.

As an illustrative example, FIG. 4 illustrates the phase stability diagram for Y—O—C system at 2000° C. Carbon partial pressure plotted in y-axis ranges from 1 to $10^{-50}$ and oxygen partial pressure plotted in x-axis ranges from 1 to $10^{-50}$. In FIG. 4, regimes where carbide, oxide or metallic yttrium phases are stable are defined by carbon and oxygen partial pressures. Similarly, FIG. 5 illustrates the phase stability diagram for Zr—O—C system at 2000° C. In FIG. 5, regimes where carbide, oxide, or metallic zirconium phases are stable are defined by carbon and oxygen partial pressures.

Referring to FIG. 4, assuming yttrium oxide ($Y_2O_3$) is exposed to a pyrolysis gas mixture having carbon partial pressure of $pC(g)=1.0\times10^{-11}$ bar and oxygen partial pressure of $pO_2(g)=1.0\times10^{-15}$ bar, the thermodynamic phase stability diagram in FIG. 4 teaches $Y_2O_3$ (the oxide phase) remains as a stable phase. However, as reflected in FIG. 5, zirconium oxide ($ZrO_2$) is exposed to the same pyrolysis gas mixture having carbon partial pressure of $pC_2(g)=1.0\times10^{-11}$ bar and oxygen partial pressure of $pO_2(g)=1.0\times10^{-15}$ bar, the thermodynamic phase stability diagram in FIG. 5 indicates that $ZrO_2$ transforms to ZrC since ZrC is the stable phase. Once zirconium carbide (ZrC) is formed, the zirconia ($ZrO_2$) ceramic is subject to carburization and carbide-oxide corrosion.

The boundary conditions for co-existence of both carbide and oxide phases of yttrium are calculated by the following equation.

$$Y_2O_3 + 4C(g) = 2YC_2 + 1.5O_2(g) \quad [1]$$

Similarly the boundary conditions for co-existence of both carbide and oxide phases of zirconium are calculated by the following equation.

$$ZrO_2 + C(g) = ZrC + O_2(g) \quad [2]$$

As an illustrative example, Table A summarizes carbon partial pressure values calculated at temperatures in the range of 1600° C. to 2200° C. and oxygen partial pressure of $10^{-15}$ bar, which is typical of a hydrocarbon pyrolysis condition.

TABLE A

The pC(g) values (bar) at $pO_2(g) = 1.0 \times 10^{-15}$ bar for Y—O—C and Zr—O—C phase stability diagrams.

| Temperature (° C.) | pC(g) for Eq. [1] | pC(g) for Eq. [2] |
| --- | --- | --- |
| 1600 | $1.00 \times 10^{-10}$ | $1.63 \times 10^{-11}$ |
| 1700 | $2.47 \times 10^{-10}$ | $9.52 \times 10^{-12}$ |
| 1800 | $5.56 \times 10^{-10}$ | $5.86 \times 10^{-12}$ |
| 1900 | $1.16 \times 10^{-09}$ | $3.78 \times 10^{-12}$ |
| 2000 | $2.26 \times 10^{-09}$ | $2.53 \times 10^{-12}$ |
| 2100 | $4.15 \times 10^{-09}$ | $1.76 \times 10^{-12}$ |
| 2200 | $7.25 \times 10^{-09}$ | $1.26 \times 10^{-12}$ |

For example, at 2000° C. and $pO_2(g)=1.0\times10^{-15}$ bar, yttrium carbide ($YC_2$) is stable at carbon partial pressure of greater than $2.26\times10^{-9}$ bar and yttrium oxide ($Y_2O_3$) is stable at carbon partial pressure of lower than $2.26\times10^{-9}$ bar. At $pC_2(g)=2.26\times10^{-9}$ bar, both $YC_2$ and $Y_2O_3$ coexist. Similarly, at 2000° C. and $pO_2(g)=1.0\times10^{-15}$ bar, zirconium carbide (ZrC) is stable at carbon partial pressure of greater than $2.53\times10^{-12}$ bar and zirconium oxide ($ZrO_2$) is stable at carbon partial pressure of lower than $2.53\times10^{-12}$ bar. At $pC_2(g)=2.53\times10^{-12}$ bar, both ZrC and $ZrO_2$ coexist. Therefore, under the condition of a pyrolysis gas mixture having $pO_2(g)=1.0\times10^{-15}$ bar and $pC_2(g)$ in the range of $2.53\times10^{-12}$ bar and $2.26\times10^{-9}$ bar at 2000° C., both $Y_2O_3$ and ZrC are stable.

Figure 6:
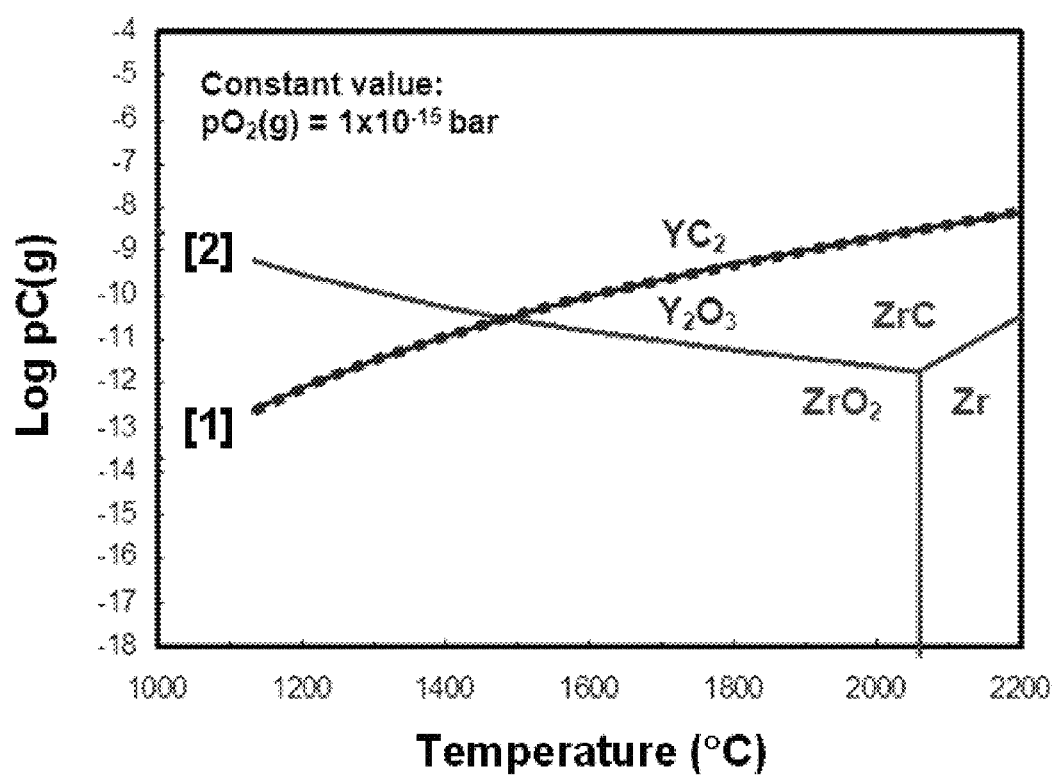
FIG. 6 provides an illustration of calculated carbon partial pressures at oxygen partial pressures of $10^{-15}$ bar, over a range of temperatures.

These points are illustrated in FIG. 6, wherein various stable phases are indicated. Line [1] on FIG. 6 represents the condition for carbide/oxide coexistence as defined by the specific yttria phases and conditions of Table A. This line represents the carbon pressure (pC(g)) for thermodynamic equilibrium between yttrium carbide ($YC_2$) and yttrium oxide ($Y_2O_3$) phase. Line [2] on FIG. 6 represents the condition for carbide/oxide coexistence as defined by the specific zirconium phases and conditions of Table A. This line represents the carbon pressure (pC(g)) for thermodynamic equilibrium between zirconium carbide (ZrC) and zirconium oxide ($ZrO_2$) phase. Suitable refractory materials according to the present inventions are more stable against carbide formation than zirconia. Such materials are defined by having a carbon pressure [pC(g)] for thermodynamic equilibrium between carbide and oxide phase that is greater than $pC(g)=10^{-11}$ at a condition of 2050° C. and $pO_2(g)=10^{-15}$ bar. This specification describes the set of materials whose carbide/oxide equilibrium lines fall above this $pC(g)= 10^{-11}$ bar at 2050° C. and $pO2(g)=10^{-15}$ bar condition. Such materials will have a complete equilibrium line similar to line [1] or [2] but at a location such that the specific pC(g) value at 2050° C. is greater than $10^{41}$ bar. Preferred materials are even more stable, having a carbon pressure [pC(g)] for thermodynamic equilibrium between carbide and oxide phase that is greater than $pC(g)=10^{-10}$ bar at a condition of $pO_2(g)=10^{-15}$ bar and temperatures from 1800° C. to 2100° C.

As may be appreciated, the term 'triple point', as used here, refers specifically to the triple point for metal, metal carbide, and metal oxide. In this figure, the zirconium triple point represents the conditions of temperature and composition where Zr, ZrC, and $ZrO_2$ are all in equilibrium with each other at the oxygen partial pressure of $10^{-15}$ bar. For these three phases (Zr, ZrC, and $ZrO_2$), the triple point occurs at specific combinations of $pO_2(g)$, pC(g) and temperature. The nature of the thermodynamics that govern this triple point is such that there is only one degree of freedom. Only one of the variables $pO_2(g)$, pC(g) and temperature can be set arbitrarily (within limits), and the other two variables are then defined by the thermodynamics of the material. So, for example, FIG. 6 is chosen to be at a fixed $pO_2(g)$ value of $10^{-15}$ bar, and the other two parameters defining the triple point (pC(g) and temperature) are the result of the thermodynamics of zirconium. In this figure, those other two parameters are a pC(g) slightly above $10^{-12}$ bar and a temperature near 2060° C. Those skilled in the art understand that the exact location of the triple point is continuously being refined as scientists measure thermodynamics and phase behavior more precisely. Because inventors have discovered that materials perform well by being able to avoid certain undesirable phase transitions, it is only natural that some embodiments of the present invention describe materials with properties given in reference to the equilibrium and triple point locations.

As a result, suitable refractory materials according to the present invention include materials that have oxide phases more stable than zirconium's oxide phase at a $pO_2(g)$ value of $10^{-15}$ bar. Such refractory materials remains in an oxide form at a pC(g) that is higher than the pC(g) at which ZrC, and $ZrO_2$ are in equilibrium. Alternately, such refractory materials remains in an oxide form at a pC(g) that is higher than the pC(g) at which the phase transition occurs between ZrC and $ZrO_2$. Materials are suitable for the present invention if they meet this thermodynamic criteria of oxide stability for any temperature a which there is a $ZrC/ZrO_2$ phase boundary. Such temperatures are typically those below the temperature of the triple point as defined at the same $pO_2(g)$ value of $10^{-15}$ bar that is applied to the thermodynamic stability criteria.

In other embodiments, suitable refractory materials according to the present invention have stable oxide phase at temperatures and pC(g) values at which zirconia has no stable oxide phases. Such refractory materials form a thermodynamically stable oxide phase at temperatures above that of the zirconium triple point. For example, such refractory materials form an oxide phase when exposed to a gas having $pO_2(g)$ value of $10^{-15}$ bar, and temperature above that of the zirconium triple point at a $pO_2(g)$ value of $10^{-15}$ bar. In another embodiment, such refractory materials forms an oxide phase when exposed to a gas having $pO_2(g)$ value of $10^{-15}$ bar, a temperature above that of the zirconium triple point at a $pO_2(g)$ value of $10^{-15}$ bar, and a pC(g) that is higher than the pC(g) at which the phase transition occurs between Zr and ZrC at that same temperature.

Furthermore, suitable refractory materials according to the present inventions may also include materials in the oxide form and materials which also have a thermodynamic preference to remain in the oxide form when exposed to a pyrolysis gas mixture having carbon partial pressure of greater than $10^{-11}$ bar, at conditions of 2050° C. and $pO_2(g)=10^{-15}$ bar. Preferably materials remains in the oxide form at carbon partial pressure of greater than $10^{-10}$ bar (at conditions of $pO_2(g)=10^{-15}$ bar and temperatures from 1800° C. to 2100° C.). A non-limited example of such refractory material is yttria (yttrium oxide, $Y_2O_3$).

It is also preferred that melting point of the refractory material is no less than 2060° C., which is about 10° C. higher than that of pure alumina (2050° C.) which years of commercial experience demonstrated as inadequate. A suitable refractory material having a melting point no less than 2060° C. is particularly preferred since it enables to process hydrocarbon feedstocks at much higher temperatures. Thus, a regenerative pyrolysis reactor apparatus for pyrolyzing a hydrocarbon feedstock, the apparatus including a revere flow regenerative pyrolysis reactor is comprised of a material having i) melting point no less than 2060° C. and ii) a thermodynamic preference to be in the oxide form when exposed to a reference gas having a carbon partial pressure of greater than $10^{-11}$ bar. In many embodiments, a preferred reactor is a regenerative reactor, and in other embodiments the reactor is a reverse flow reactor, while in still other embodiments the reactor is a deferred combustion reverse flow regenerative pyrolysis reactor.

Example 1

An yttria ceramic composition was prepared by mixing 50 wt. % of the first grit Amperit 849.054 $Y_2O_3$ powder (H.C. Starck), 30 wt. % of the second grit $Y_2O_3$ powder (1 μm average particle size, 99.9%, from Alfa Aesar) and 20 wt. % of the third grit Grade C $Y_2O_3$ powder (H.C. Starck). About 30 wt. % additional organic binder was mixed with the ceramic powder to provide green body strength during forming process. The powder was extruded into a honeycomb shape (300 cpsi) in the size of about ¾" diameter×1.0" thickness. The extruded honeycomb green body was then sintered at 1600° C. for 4 hours in air and annealed at 1900° C. for 4 hours in argon to form a fired ceramic body. The resultant yttria ceramic body was also comprised of about 15 vol. % porosity mainly derived from the first grit Amperit 849.054 $Y_2O_3$ powder. This residual porosity provides thermal shock resistance. The produced yttria honeycomb sample was tested in a reverse-flow reactor for about 24 hrs wherein a pyrolysis gas mixture has carbon partial pressure of about $1.0 \times 10^{-11}$ bar. The tested sample was microscopically examined by use of scanning electron microscopy (SEM) and revealed no signs of carbide-oxide ceramic corrosion.

As much of the discussion herein pertains to sizes and concentrations of components and materials after sintering, the terms "grain" and "particle" are used interchangeably herein. The "grains" that are formed and are observable after sintering, are derived from a mixture of particles (some of which might also include several grains, however) that are mixed and combined prior to sintering. Grain size or particle size, refers to the effective diameter or geometric size of individual grains of the matrix comprising a multimodal grain distribution. A grain or particle is the individually definable substantially homogenous units of zirconia or yttria or other granular material that forms the entirety of the ceramic material or component. The grains or particles are sintered and bonded together at grain boundaries to create a formed ceramic component. Dynamic light scattering and laser light diffraction analysis using a unified scatter technique (Microtrac® 3500) can be used to determine average particle size and particle size distribution. Microtrac® instruments can measure particle size ranging from 0.024 to 2800 μm and provide good instrument-to-instrument agreement, sample-to-sample agreement, instrument internal repeatability and particle distribution breadth.

The "D50" or average particle size measured by a laser light diffraction method is one type of average particle size represented as D50 or mean diameter. The D50 average particle size is a value determined by using a particle size distribution measuring device and represents a particle sample cut diameter which is the 50% volume or weight fraction value after determining the minimum and maximum sizes contributing to the integrated volume of a specific peak of a particle size distribution. Similarly D90, D10, D99 respectively corresponds to the 90, 10 and 99% volume or weight fractions of the particle size distribution. The average (D50) or any other particle size cut value can be determined by microscopy methods such as optical microscopy (OM), scanning electron microscopy (SEM) and transmission electron microscopy (TEM). The average particle size values measured by microscopy methods also can be converted to D50 values by methods known in the field. The particle size distribution of the first grains alternatively can be determined by a sieve and mesh classification method as known in the art.

The particles can be substantially any shape. In many embodiments, a preferred shape may be those particle shapes that are substantially spherical or more spherical in dimensions than nonspherical. Some non-limiting acceptable examples include spherical, ellipsoidal, polyhedral, distorted spherical, distorted ellipsoidal, distorted polyhedral shaped, angular, rectangular, tetrahedral, quadrilateral, elongated, etc. The shape of smaller grain particles may generally be of less importance than the shape of relatively larger particles. Spherical grains may be particularly beneficial in providing close packing, density, optimum porosity, and flowability during powder processing and fabrication. A preferred spherical shape of the first grain can be characterized by an aspect ratio less of than 2.5, or preferably less than 2.0, or more preferably less than 1.5. Grains with generally smoother surfaces may also be preferred as compared to grains having highly irregular surface shapes.

Spherical shape refers to a symmetrical geometrical object where the set of all points in three dimensional space ($R^3$) which are at the distance R from a fixed point of that space, where R is a positive real number called the radius of the sphere. The aspect ratio of a shape is the ratio of its longest axis to its shortest axis. The aspect ratio of symmetrical objects may also be described by the ratio of two measures (e.g. length and diameter). The aspect ratio can be measured by microscopy methods such as optical microscopy (OM), scanning electron microscopy (SEM), and transmission electron microscopy (TEM), in combination with image analysis software, wherein a two-dimensional shape is projected.

In some embodiments, the inventive material, components, and reactor systems may include yttria stabilized zirconia grains having a D50 grain size in the range of from 0.01 μm up to 2000 μm, while in other embodiments, the reactor system may include yttria stabilized zirconia grain sizes having a D50 grain size in the range of from 0.01 μm to 800 μm, in other embodiments, from 5 μm to 800 μm. The inventive composition might also include other grain sizes, many of which will have a minimum grain size of at least 0.01 μm, or at least 0.125 μm, or at least 0.2 μm, or at least 1 μm, or at least 2 μm, or at least 5 μm, or at least 10 μm. An upper limit for the other grain sizes present may include grain sizes of up to 400 μm, or up to 200 μm, or up to 100 μm, or up to 50 μm, or up to 40 μm, or up to 20 μm, or up to 10 μm, or up to 5 μm, or up to 2 μm, or up to 1 μm. The aforementioned list of grain sizes is merely exemplary and not exhaustive. Other similar ranges of grain sizes are useful for the inventive composition. The size preference may be determined by the particular component being prepared and its intended use, temperature ranges, and stress conditions. For example, dimensionally larger, heftier components can utilize grain sizes within the broader ranges, including the larger ranges, while more intricate or delicate components such as thin-walled honeycomb monoliths or other relatively delicate or high stress component might particularly benefit from the relatively smaller grain size ranges.

As stated previously, in addition to a minimum yttria concentration being useful at controlling carburization and carbide-oxide ceramic corrosion, it has recently been learned that porosity can also play a significant role in controlling ceramic corrosion. Porosity facilitates small scale matrix flexibility among the matrix particles while also permitting dissipation of both mechanical and thermal stress concentrations (particularly with respect to arresting crack propagation). Although porosity plays a significant role with respect to the high strength and thermal shock resistance of the inventive ceramic materials, a downside to the porosity is that too much porosity, particularly open porosity that pores are connected to the exterior surfaces of the ceramic body, can permit coking and infiltration of carbon within the ceramic structure, which in turn may lead to localized ceramic corrosion or carbon deposition within the interior of the ceramic body. Surprisingly, it has been learned that a balance should be struck between too much porosity and too little. According to the present invention, many suitable refractory materials may include highly dense materials that have less than 5 vol. % porosity, and in other embodiments less than 2 vol. %, or less than 1 vol. %, or even substantially no porosity in some embodiments. Such dense bodies may benefit from improved resistance to carbon permeation or carburization.

Other suitable embodiments may include some porosity, such as to take advantage of the previously disclosed mechanical strength and thermal shock resistance benefits of a slightly porous or somewhat porous ceramic body, preferably having substantially uniform sized and evenly distributed pores. In some embodiments, the inventive material or compositions have a minimum porosity value, such as at least 2 vol. %, or in some various embodiments, at least 5 vol. %, or at least 8 vol. %, or at least 10 vol. %, or at least 15 vol. %, or at least 20 vol. %, or sometimes at least 25 vol. %, or even up to 28 vol. %, including various combinations of ranges thereof. More importantly however from the standpoint of preventing ceramic corrosion problems, the inventive material or compositions have a maximum porosity value, such as up to 10 vol. %, or up to 15 vol. %, or up to 20 vol. %, or up to 25 vol. %, or perhaps in some embodiments even up to 28 vol. %, based upon the bulk volume of the inventive material. The porosity range of 0 to 28 vol. % as used herein is defined for the limited purpose of preventing carburization and carbide-oxide ceramic corrosion, with the desired, more specific narrower porosity range defined after consideration of other performance properties such as but not limited to strength and thermal shock resistance. For porous embodiments, a suitable porosity range may be from 2 to 28 vol. %.

Fully dense or highly dense refractory materials according to the present invention may enjoy the benefit of limiting carbon permeation and resistance thermal distortions. Such embodiments, particularly those in the oxide form, may also enjoy sustained purity and stability to remain in the oxide form. In other embodiments, the prescribed porosity feature may be attributed with providing improved thermal stress crack resistance by inhibiting crack formation and arresting crack propagation, and simultaneously facilitating some elastic deformation of the matrix structure, thereby providing enhanced service life in the stressful, high temperature, cyclic thermal applications. Porosity also provides high surface area for improved heat absorption and dissipation, as compared to typically less-porous, high-density, high-strength ceramics such as common refractory and engineering grade ceramics. Some of the other various functions of the porosity include but are not limited to increased surface area for hear transfer, increased thermal shock resistance, mitigation of crack propagation, improved flexural strength, etc. Selecting the most appropriate density or porosity range depends upon consideration and balancing of these and other various performance objectives, including controlling ceramic corrosion, to ascertain the most desirable porosity for a particular material or component. The porosity of the ceramic matrix of the formed ceramic component is measured at ambient temperature, such as at 20° C., after sintering the green body for at least ten minutes at 1500° C. Preferably, the desired porosity range is retained after prolonged exposure to the operation temperature and after annealing or at operational temperatures above 1500° C., such as up to 1800° C. or even up to 2000° C. Porosity is preferably substantially uniformly dispersed throughout the composition.

It has recently been learned that limiting the maximum porosity to such values tends to effectively, if not actually limit interconnectivity of the pore spaces with other pore spaces to an extent that inhibits migration of elemental carbon or carbon compounds within the inventive material or components (e.g., limited effective permeability to carbon and carbon compounds). This limited permeability helps mitigate or limit carbon penetration among the pores and matrix of the inventive material during high temperature pyrolysis of hydrocarbon feedstocks, thereby mitigating or limiting the potential for carbide-oxide ceramic corrosion. Carbon may still penetrate the surface pores and perhaps some near-surface pores of the inventive material or components during hydrocarbon pyrolysis, but the limited porosity will constrict carbon from permeating deeper or dissipating throughout the entirety of the material or component, due to lack of effective permeability to carbon or carbon compounds. However, suitable refractory materials in the oxide form should be thermodynamically resistive to alteration to the carbide or other forms, even in the presence of concentrated carbon at pyrolysis conditions. The optimal or acceptable porosity ranges for the inventive material or component depends upon the desired final component performance properties, but is within a range defined by one or more of the minimum porosity values and one or more of the maximum porosity values, or any set of values not expressly enumerated between the minimums and maximums (e.g., between substantially 0 vol. % and 28 vol. %).

In addition to the desirability of controlling carburization and ceramic corrosion by the presence of the oxide form in the refractory material and such material having a melting point of no less than 2060° C., the overall performance characteristics of the inventive ceramic material may also be attributable at least in part to one or more of various other inventive material characteristics such as but not limited to, the particle size and arrangement, or in some embodiments the multimodal particle sizes and distribution, material selection, degree of stabilization, manufacturing methods and techniques used, actual porosity, and combinations thereof. However, the combination of the porosity and the substantial yttria concentration uniquely preserves an otherwise improved combination of MOR flexural strength, thermal shock resistance, and component life expectancy that was not previously known in the industry. The virtues and functions of these other performance parameters and features have been described in previous patent applications, including U.S. patent application filed Dec. 21, 2006, Ser. No. 11/643,541, entitled "Methane Conversion to Higher Hydrocarbons," related primarily to methane feedstocks for pyrolysis systems the entirety of each are incorporated herein by reference to the extent not inconsistent with this invention.

The superior thermal shock resistance, relative chemical inertness, preserved crystalline structure, improved flexural strength, and high temperature capability of the inventive compositions, components, and reactors of the present invention provide crystalline stability and structurally soundness under cyclical thermal conditions at temperatures of 1500° C. and higher, such as up to 1700° C., 1800° C., or in some embodiments, up to 2000° C., particularly as compared to prior art refractory and thermal components and reactors. Such attributes and properties may facilitate components and reactors that can replace conventional refractories and also facilitate use of processes in relatively large scale commercial applications that were previously not economical or technically achievable. In particular, the heat stable, formed ceramic components, reactors, and processes may find particular application in refining, petrochemical, chemical processing, and other high temperature thermal applications. It is believed that the improved combination of properties provided according to the present disclosure may facilitate commercial service periods of greater than 1 year, for example even up to about 10 years in some applications.

The particles or grains can be either single crystalline or polycrystalline. Polycrystalline grains are made of many smaller crystallites with varying orientation. Various types of grains can be utilized which include but are not limited to agglomerated and sintered, fused and crushed, and spherodized. In one form, the grains are agglomerated and sintered powder which is produced by spray drying of a suspension consisting of fine powders and organic binder and subsequent sintering. In another form, the grains are fused and crushed, which is produced by fusing in arc furnaces and crushing of the cold block. In still another form of the disclosure, the grains are spherodized, such as by atomization of agglomerates using a plasma flames to fabricate substantially spherical shaped particles.

In one form, the inventive material and components may be prepared by manufacturing techniques such as but not limited to conventional ceramic powder manufacturing and processing techniques, e.g., mixing, milling, pressing or extruding, sintering and cooling, employing as starting materials a suitable ceramic powder and a binder powder in the required volume ratio. Certain process steps may be controlled or adjusted to obtain the desired porosity range and performance properties, such as by inclusion of various manufacturing, property adjusting, and processing additives and agents as are generally known in the art. For example, the two or more modes of powders, oxides, preservatives, and/or stabilizers may be milled in a ball mill in the presence of an organic liquid such as ethanol or heptane for a time sufficient to substantially disperse the powders in each other. Excessive binder powder and liquids may be removed and the milled powder dried, placed in a die or form, pressed, extruded, formed, caste or otherwise formed into a desired shape. The resulting "green body" is then sintered at temperatures of at least 1500° C. and commonly up to about 1800° C. for at least ten minutes, and often for times typically ranging from about 10 minutes to about two hours and in some applications even up to 4 hours. The sintering operation may be performed in an oxidizing atmosphere, reducing atmosphere, or inert atmosphere, and at ambient pressure or under vacuum. For example, the oxidizing atmosphere could be air or oxygen, the inert atmosphere could be argon, and a reducing atmosphere could be hydrogen. The sintering atmosphere, temperature, and kiln environment may also introduce secondary oxides (as discussed previously herein) into the component, either desirably or undesirably, as a contaminant or desired/permitted constituent of the ceramic component. Thereafter, the sintered body is allowed to cool, typically to ambient conditions. The cooling rate may also be controlled to provide a desired set of crystal sizes and performance properties in the particular component.

In some embodiments, the present invention includes ceramic compositions having a single mode or "monomodal" grain size distribution, or an essentially non-modally-defined broad grain size distribution, or a substantially single grain size distribution, or combinations thereof. In other embodiments, the present invention includes ceramic compositions having a multimodal (e.g., bimodal, trimodal, etc.) grain distribution, and/or an embodiments lacking in modal definition. However, for purposes of preparing ceramic zirconia compositions, and apparatus that are resistive to oxide-carbide ceramic corrosion, the particular grain structure is less relevant consideration than is the type of stabilizer (e.g., yttria), the minimum concentration thereof, and preferably also the controlled porosity range.

The present invention is not limited to monomodal or multimodal grain distributions, and includes substantially any suitable grain distribution that is resistive to carburization via the methods taught herein, and preferably also including materials that also exhibit other various desirable performance properties, such as but not limited to strength, thermal shock resistance, low vaporization, porosity, etc. In some embodiments, the advantageous physical performance properties and/or characteristics of the material (e.g., flexural strength and thermal shock resistance) may be enhanced or realized in part from close packing of the ceramic grains. For example, in a multimodal embodiments, one mode of a bimodal grain distribution may include a D50 first grain particle size in the range of from 5 to 2000 μm, or from 5 to 800 μm; and the second grain mode of grain distribution, including the preservative component, includes a D50 particle size in the range of from at least about 0.01 μm to not larger than one-fourth (¼) of the D50 grain size of the first grain. The second grains are substantially evenly disbursed within the first grains. In other exemplary embodiments, the second grains may include a D50 size value that ranges from 0.01 to 100 μm. In other embodiments, for example, the second mode grains may include a D50 size value that ranges from 0.05 to 44 μm, while in still other embodiments the second mode grains include a D50 size value that ranges from 0.05 to 5 μm. For example, in one embodiment, the first grain mode may include a D50 size that ranges from 20 to 200 μm, while the corresponding second grain mode may range from 0.05 to 5.0 μm. In still other embodiments, the second grain mode may include a D50 average size diameter not greater than one-eight the D50 size of the corresponding first grain mode. In some embodiments the D50 size of the fine mode grains may not exceed one tenth the D50 size of the first mode grains (e.g., not larger than one order of magnitude smaller than the first grain mode), while in other embodiments the D50 size of the second grain mode will generally be less than about two orders of magnitude smaller than the D50 size of the first grain mode (e.g., the second grains are sometimes not larger than about 100 times smaller than the D50 diameter of the first grains).

For still other various exemplary embodiments the D50 lower limit of the second grain stabilized zirconia may be 0.01 or 0.05 or 0.5 or 1 or 5 μm in diameter. A practical D50 lower limit on the second grain stabilized zirconia grains for many embodiments may be about 0.1 μm. Grains smaller than 0.1 μm may tend to be of limited usefulness in many applications due to the fact that such small grains may not distribute evenly and tend to melt together and combine into sintered grains that are of about the same size as do grains that are at least 0.1 μm. The stabilized zirconia and stabilizer grains that are of at least about 0.1 μm in diameter typically do not change size during or after sintering, whereas the nanoparticles may tend to combine into larger particles. For at least these reasons, the second grain mode of many embodiments of the subject invention might not include nanoparticle D50 size grit, unless such mode is purposefully introduced into and mixed with the coarse and second grain modes as a third or other mode, or as a secondary oxide. Commonly, nanoparticle modes of zirconia or stabilizer may generally only be considered as the second grain mode of the multimode structure when such grains are of sufficient presence to combine with each other to provide a second grain mode after sintering that provides mode grains of at least 0.01 μm after sintering and more preferably at least 0.1 μm after sintering. The D50 upper limit of the second grain mode, including the preservative component particles, may be 500 or 100 or 44 or 20 or 15 or 10 or 5 or 1 μm in diameter. The D50 lower limit of the first grain stabilized zirconia may be 5 or 20 or 25 or 30 or 40 or 100 μm in diameter. The D50 upper limit of the first grain stabilized zirconia may be 800 or 500 or 200 or 100 or 50 μm in diameter. The lower size limitation however, for the second grain mode, including the limitation for the preservative component particles therein, is consistent with size limitations for the other particle size limitations and ranges pertaining to the second grain mode and is a D50 diameter of at least 0.01 μm, and sometimes preferably at least 0.1 μm. "First" and "second" grain sizes referenced above are merely exemplary to a bi-modal embodiment. Numerous modes and non-modally defined grain distributions are also within the scope of the present invention. In these other mode or grain distribution types, suitable grain distribution sizes are within substantially any of the listed grain size ranges discussed with respect to the exemplary "first" and "second" grain embodiments.

A non-limiting example of a multimodal (bimodal) grain distribution may include from 1 to 20 wt. % of second grain particles and 80 to 99 wt. % of first grain particles. Another non-limiting example is a grain distribution that includes from 1 to 50 wt. % of second grain particles and 50 to 99 wt. % of first grain particles. Yet another non-limiting example is a grain distribution that includes from 1 to 80 wt. % of second grain particles and 20 to 99 wt. % of first grain particles Still another suitable, non-limiting example of a bimodal grain distribution includes 20 to 30 wt. % of first grains, such as but not limited to a D50 particle size of 30 μm, and 70 to 80 wt. % of second grains, such as but not limited to a D50 particle size of 0.3 μm. Another suitable, non-limiting example of a bimodal grain distribution includes 30 to 40 wt. % of first grains, such as but not limited to a D50 particle size of 30 μm, and 60 to 70 wt. % of second grains, such as but not limited to a D50 particle size of 0.3 μm. Another suitable, non-limiting example of a bimodal grain distribution includes 50 to 70 wt. % of first grains, such as but not limited to a D50 particle size of 30 μm, and 30 to 50 wt. % of second grains, such as but not limited to a D50 particle size of 0.3 μm. Another suitable, non-limiting example of a bimodal grain distribution includes 85 to 99 wt. % of first grains, such as but not limited to a D50 particle size of 30 μm, and 1 to 15 wt. % of second grains, such as but not limited to a D50 particle size of 0.3 μm. Yet another suitable, non-limiting example of a bimodal grain distribution includes 94 to 99 wt. % of first grains, such as but not limited to a D50 particle size of 30 μm, and 1 to 6 wt. % of second grains, such as but not limited to a D50 particle size of 0.3 μm.

Other materials properties have been previously identified as having significant importance for some embodiments of the invention, particularly with regard to the high-severity performance of some refractory materials and ceramics in pyrolysis reactors and their corresponding suitability for application in large scale thermal processes; namely, thermal shock resistance and mechanical flexural strength (modulus of rupture, "MOR"). Other properties, such as but not limited to crystalline/chemical stability at high temperature and toughness are also beneficial and should be considered when selecting an appropriate ceramic materials or components for an application. Retention or maintenance of these and other properties over the useful life of the ceramic component may also be typically desirable. With regard to maintaining longevity of such properties in components, one of the factors is the crystalline/chemical stability at high temperatures. The suitably fabricated component should retain its thermal shock resistance and mechanical flexural strength over a suitable life span by not prematurely degrading or undergoing crystalline alteration, such as due to loss of stabilizer and/or due to carbide-oxide corrosion. The instant inventions incorporate particular features that function to maintain or preserve the crystalline stability, thermal shock resistance, and mechanical flexural strength, and possibly other related properties, for extended periods of time as compared to the useful duration of one or more of such properties in materials lacking the inventive preservative and/or ceramic corrosion resistance features.

Regarding the two above-referenced performance properties, (thermal shock resistance and mechanical flexural strength), thermal shock resistance of a ceramic component can be defined as the maximum change in temperature that the material can withstand without failure or excessive damage. Thermal shock resistance is an evaluated parameter but not a material property. Description of thermal shock resistance may depend upon the type of thermal cycle, component geometry, and strength as well as on material properties or factors. Simplified mathematical expressions relying upon a variety of assumptions can be used to describe material performance under a set of conditions. Alternatively, much more complex analyses may be performed using numerical analysis methods such as finite element and stress-strain analysis. However, for materials performance comparison purposes a qualitative or direct comparative analysis is also useful and more practical. Thermal shock resistance may be evaluated by means of rapid water quench experiments such as illustrated in ASTM C1525. Thermal shock damage results from buildup of thermal and physical stresses, usually during rapid heating or rapid cooling.

For example, the ASTM C1525 thermal shock resistance test method builds on the experimental principle of rapid quenching of a test specimen (e.g., 1"×1"×⅛" square, or 2.54 cm×2.54 cm×0.32 cm square) from an elevated temperature (e.g., 1100° C.) into a water bath at room temperature. After water quenching, the specimen is dried and dye-penetrated to investigate both open and closed cracks. For instance, Zyglo® water washable dye penetrants may be used. As the zirconia samples are typically white or yellow, pink dye provides a vivid depiction of cracks and helps differentiate cracks from background or grain boundaries. Methods for determining the cumulative or total crack length per unit area in each specimen are known in the art and may be determined by scanning software electronically aggregating the lengths of all cracks, backed up with visual confirmation by the technician. The electronic scanner resolution or magnification is generally not critical, e.g., from as low as from 50× to as high as 1000×. The tester need only be able to differentiate actual cracks from mere grain boundaries. As with any specified parameter, the value determined should be made over a sufficiently large region to provide a statistically sound representation of the entire sample. The total crack length per unit area may be determined over such area by aggregating and averaging a number of smaller regions that collectively represent a statistically sound region. A whole component may be studied or one or more regions may be evaluated. The studied or relevant region(s) or the whole component may be considered a "component" for test purposes herein.

Utilizing propensity of cracks observed in a test specimen, the thermal shock resistance for a particular region or component may be normalized and qualitatively scored, such as from 1 (the least resistance) to 5 (the most resistance) as summarized hereunder:

1: Open cracks and many closed cracks.
2: Many closed cracks.
3: Some closed cracks.
4: Little closed cracks.
5: No cracks.

Figure 3:
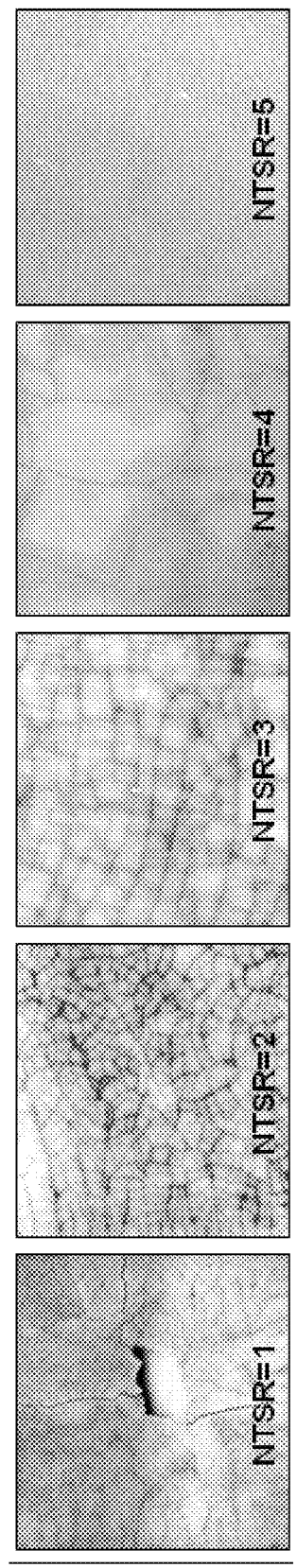
FIG. 3 provides photographic examples of stress cracking of various ceramic samples graded from 1 to 5 as further described herein to illustrate corresponding normalized thermal shock resistance.

The appearance of various degrees of cracking in rapidly quenched zirconia specimens or components and their corresponding qualitative, normalized thermal shock resistance (NTSR) value from 1 to 5 are illustrated in FIG. 3. A rating of 1 is least acceptable while a rating of 5 is most acceptable. The herein disclosed inventive compositions will typically produce a normalized NTSR rating of 3, 4, and 5. To quantify propensity of cracks observed in a thermal shock resistance test specimen, dye penetrated samples were optically scanned and subjected to an image analysis computer software program. For example, a total crack length per unit area of the test specimen may be measured by use of commercially available image analysis software, e.g., Clemex Vision PE, as reported in Table 2, and corresponding generally with the illustrative images of FIG. 3. (Other image analysis software applications are also available to similarly measure the total crack length of the specimen.)

TABLE 2

Illustrative examples of normalized thermal shock resistance (NTSR) index or rating, ranked from 1 to 5.

| NTSR Index | Measured total crack length per unit area ($cm/cm^2$) | Criteria of total crack length ($cm/cm^2$) |
| --- | --- | --- |
| 1 | 81.2 | >50 |
| 2 | 25.6 | >20-≤50 |
| 3 | 16.5 | >5-≤20 |
| 4 | 3.5 | >1-≤5 |
| 5 | 0.01 | ≤1 |

The stabilized refractory grade zirconia of this invention preferably demonstrates a total crack length per unit area after quenching a test specimen of the inventive material from 1100° C. into a water bath at room temperature that is not greater than 5 $cm/cm^2$; that is, it preferably has a NTSR of at least 4. Still more preferably, the stabilized refractory grade zirconia of this invention demonstrates a total crack length per unit area after quenching a test specimen of the stabilized refractory grade zirconia at 1100° C. into a water bath at room temperature that is more preferably not greater than 1 $cm/cm^2$; that is, more preferably has a NTSR of 5. However, for less demanding applications, the inventive components may demonstrate crack lengths in excess of 5 $cm/cm^2$, but preferably not greater than 20 $cm/cm^2$, thus having a corresponding NTSR of 3 or higher. The intended application determines the range of acceptable crack length. Thus, materials according to the present invention include those having a thermal shock resistance rating of 4 or 5, as described herein.

As set forth in ASTM C 1525-04, thermal shock resistance can be assessed by measuring the reduction in flexural strength (MOR) produced by rapid quenching of test specimens heated across a range of temperatures. For purposes of the stabilized zirconia of this invention, regarding quantitative measurement of thermal shock resistance, a temperature interval may be determined by a reduction in the mean flexural strength of a determined amount, such as for example, at least 30%. However, the test does not determine thermal stresses developed as a result of a steady state temperature differences within a ceramic body or of thermal expansion mismatch between joined bodies. Further, unless the test is repeated several times, the test is limited in its ability to quantitatively determine the resistance of a ceramic material to repeated or cyclic shocks. Thus, it is preferred that the test be repeated to analyze the effect of cyclic temperature shocks, such as may be experienced in a regenerative reactor.

Another ceramic performance property with respect to the instant invention is flexural strength, which can be measured by 3-point bending tests as illustrated in ASTM F417. The test specimen, a small bar of square cross section, rests on two cylindrical supports in a compression test machine. It is bent by the application of force, at mid-span, to the opposite face of the bar from that resting on the two supports. The bending force is applied by a third cylinder (identical to the other two) at a prescribed constant rate until the specimen breaks. The breaking rod, the dimensions of the specimen, and the test span are used to calculate flexural strength.

As a ceramic material is heated, its density typically increases as a result of pore shrinkage due to the sintering effect caused by the heat. Sintering may result in some of the ceramic crystals or components therein melting or undergoing other high temperature fusion or shrinkage, resulting in a slight decrease in bulk volume, but with an increase in component strength. Thus, as a ceramic is heated, its MOR or mechanical flexural strength may typically also correspondingly increase slightly. However, when the hot ceramic is subjected to relatively quick cooling, such as via water quenching, stress fractures may be introduced thereby causing a weakening or reduction in the mechanical flexural strength. The combination of the multimodal grains and the porosity remaining after sintering results in a lattice type structure that provides the improved strength, heat stress dissipation and handling characteristics, and cyclic thermal stress resilience. The ceramic corrosion resistance features prevent degradation of these desirable properties, thereby extending component life.

The MOR and thermal shock property values refer to those property values determined after sintering, unless stated otherwise. ASTM 1505 describes the process for MOR determination. Limited duration exposure of the sintered component to annealing temperatures in excess of 1500° C., such as in excess of 1600° C. or at least 1800° C., may further refine the component properties as described herein. Such further thermal processing or annealing may generally further improve the strength and thermal shock resistance of the inventive components and reactors as compared to such properties after original sintering. After such "annealing" of the sintered component, such as at temperatures in excess of commercial use temperature, such as at an exemplary temperature of at least 1800° C. for two hours, the formed ceramic component according to this invention will demonstrates a retained porosity at ambient temperature in the range of from 5 to 45 vol. % based upon the formed volume of the component. Such components also demonstrate a flexural strength (MOR) of at least 6 kpsi, preferably at least 10 kpsi, and provide a thermal shock resistance rating of at least four (4), preferably at least five (5). The MOR flexural strength of the zirconia ceramic used for materials and reactor components according to this invention should be greater than or equal to about 6 kpsi (41.3 MPa) after initial sintering to at least 1500° C. and subsequent quenching to ambient temperature. Also, the MOR is preferably greater than or equal to about 6 kpsi (41.3 MPa) when the sintered component is further thermally conditioned, such as by reheating and quenching (e.g., annealed) to operating conditions. For example, the thermal conditioning may entail reheating the component to a temperature in a range such as from 1500° C. to 1800° C. or perhaps even up to 2000° C. Surprisingly, many of the inventive components routinely demonstrate a MOR of at least 6 kpsi (41.3 MPa) after further thermal processing. The combination of a normalized thermal shock resistance rating of 4, with such MOR strength is recognized herein as a minimal MOR and shock resistance properties that are necessary across the required broad reactor temperature spectrum to provide for long-term commercial utilization of high temperature pyrolysis chemistry processes, over a desired life cycle of the reactor component. The corrosion resistance component of this invention functions to prolong these properties of the component within that range of acceptability, correspondingly extending the useful life of the component and process. If desired, the effect of long duration MOR changes may also be evaluated to determine commercial suitability, such as the MOR after, say for example, one month of cyclic processing (annealing). The components and apparatus of the subject invention, however, are expected to provide life duration for the relevant components and apparatus beyond the level that was previously available in the art.

In one aspect, this invention includes a refractory material, such material having application in one aspect for use with a regenerative thermal pyrolysis reactor apparatus, such as for components useful for pyrolyzing a hydrocarbon feedstock (e.g., petroleum liquids, gas, or coal). In other aspects, this invention may be utilized for pyrolyzing or otherwise thermally processing various feedstocks other than hydrocarbon feeds at high temperature, such as but not limited to other high temperature chemical processes, reactions, such as but not limited to using various oxidizable, flammable, combustible, or otherwise thermally reactive materials, whether solid, liquid, or gas. Although the inventive materials are useful at high temperatures (>1500° C.), they may also be useful in various lower temperature applications. The term "hydrocarbon feedstock" as used herein is defined broadly to include virtually any hydrocarbonaceous feed and may also include substantially carbonaceous feeds such as graphite or coke. Exemplary hydrocarbon pyrolysis feedstocks that may have particular applicability for use in the present invention typically comprises but are not limited to one or more hydrocarbons such as methane, ethane, propane, butane, naphthas, gas oils, condensates, kerosene, heating oil, diesel, hydrocrackate, Fischer-Tropsch liquids, alcohols, distillate, aromatics, heavy gas oil, steam cracked gas oil and residues, crude oil, crude oil fractions, atmospheric pipestill bottoms, vacuum pipestill streams including bottoms, heavy non-virgin hydrocarbon streams from refineries, vacuum gas oils, low sulfur waxy residue, heavy waxes, coal, graphite, coke, tar, atmospheric residue, heavy residue hydrocarbon feeds, and combinations thereof. Undesirable fractions, solids and non-volatiles contained in the feedstreams may optionally be removed by one or more separation techniques, prior to feeding a volatizable fraction into the reactor. Diluents or other additives, such as but not limited to steam, water, methane, and hydrogen, may also be included within the feedstreams.

This invention includes but is not limited to use of components, apparatus, reactors, and methods disclosed in various, previous patent applications, the entirety of each of which are included herein by reference, including (i) US application serial number 60/753,961, filed Dec. 23, 2005, titled "Controlled Combustion for Regenerative Reactors," (ii) U.S. application Ser. No. 11/639,691, filed Dec. 15, 2006, titled "Controlled Combustion for Regenerative Reactors;" (iii) U.S. application Ser. No. 11/643,541, filed Dec. 21, 2006, titled "Methane Conversion to Higher Hydrocarbons;" (iv) U.S. patent application Ser. No. 12/119,762, filed May 13, 2008, titled "Pyrolysis Reactor Conversion of Hydrocarbon Feedstocks Into Higher Value Hydrocarbons;" and U.S. patent application Ser. No. 12/467,832, filed 18 May, 2009, titled "Pyrolysis Reactor Materials and Methods." These patent applications teach and disclose various apparatus and methods for pyrolyzing hydrocarbon feeds in reverse flow regenerative pyrolysis reactors, including deferred combustion and controlled heat positioning processes.

The present inventions disclosed herein may be suitable for use with but not limited to refractory applications, and pyrolysis and thermal reactors as disclosed in these previous applications. The inventive components provide the strength, thermal shock resistance, and chemical stability required to enable commercialization of such apparatus and processes to operate at temperatures of at least 1500° C., and even in some embodiments in excess of 1600° C., in still other embodiments in excess of at least 1700° C., and in even other embodiments at temperatures in excess of 2000° C. The inventive materials, components, apparatus, and process enable large-scale, cyclic, high temperature, reactor systems that are useful and operable on a commercially desirable scale and life cycle.

The inventive materials and components may be provided, for example, in one or more pyrolysis reactors, such as but not limited to those reactors having regenerative reactor beds or cores that are useful for carrying out a high temperature chemical reaction. The inventive ceramic components also may be used in construction of one or more reactor embodiments, components, or regions of the reactor system, and may be of substantially any suitable geometry, form or shape, such as but not limited to spheres, beads, honeycomb materials, tubes, pipes, U-tubes, fluid mixers, nozzles, extruded monoliths, bricks, tiles, reactor trays, tray components, and other refractory components that are exposed to high temperature. Such components, as used in a reactor, may by design include flow channels, conduits, or other space which may be regarded or referred to as "void volume" through which fluid passes as part of the function of the component. It is understood that such void volume is not considered to be part of the "porosity" of the ceramic material as described herein. The ceramic porosity specified herein is specifically for the matrix or portion of the component that does not carry flow; often referred to as the wall or the solid portion of the component. Similarly, references to the volume of the material or component are referring to the ceramic matrix volume, including the porosity therein, and not to the primary fluid conducting channels or void volume. The sustained strength and relative inertness properties of the inventive materials may provide for a wider range of component geometries and function than previously available in the art, again also leading to process improvements.

In one aspect, the invention includes a reactor apparatus for pyrolyzing a hydrocarbon feedstock, the apparatus including: a reactor component comprising a refractory material in oxide form, the refractory material having a melting point of no less than 2060° C. and which remains in oxide form when exposed to a gas (e.g., a reference gas mixture containing carbon and oxygen at the stated conditions) having carbon partial pressure of $10^{-11}$ bar, an oxygen partial pressure of $10^{-15}$ bar, at a temperature of 2050° C. In some embodiments the refractory material has a melting point of no less than 2160° C.

In some preferred embodiments, the refractory material remains in the oxide form when exposed to a gas (e.g., a reference gas mixture) having a carbon partial pressure of $10^{-10}$ bar, an oxygen partial pressure of $10^{-15}$ bar, at a temperature over the full range of from 1800° C. to 2100° C. In some embodiments the refractory material has a melting point of no less than 2160° C.

According to the present invention, in some embodiments the crystalline structure of the refractory material is cubic during heat-up from 1250° C. to 2250° C., while in other embodiments the crystalline structure of the refractory material is cubic during cool-down from 2250° C. to 1250° C. In many preferred embodiments, the vapor pressure of the refractory material is less than $10^{-7}$ bar at 2000° C.

In other aspects, the invention includes apparatus fashioned from or including the inventive materials, such apparatus preferably having application with high temperature hydrocarbon pyrolysis systems and methods. In some embodiments, the reactor component includes at least one of flow channels, a reaction fluid mixer, and a reaction heat sink member. In other sometimes preferred embodiments, the reactor component comprises a honeycomb monolith having flow channels within the monolith for conducting at least one of a pyrolysis reactant and a pyrolysis product through the monolith.

Sometimes it may be preferred that the inventive refractory materials meet other preferred application requirements, such as mechanical strength and thermal shock resistance. In some embodiments, the reactor component comprises a thermal shock resistance rating that demonstrates a total crack length per unit area after quenching the reactor component from 1100° C. into a water bath to a temperature of 50° C. is not greater than 30 cm/cm$^2$, while in other embodiments, the total crack length per unit area after quenching is not greater than 5 cm/cm$^2$. Other embodiments or applications may prefer that the reactor component comprises a modulus of rupture mechanical flexural strength of not less than 13.8 MPa at a temperature in a range of from 1000° C. to 2000° C.

In some embodiments, the inventive refractory material may comprise at least 50 wt. % yttrium oxide (yttria) based upon the total weight of the refractory material. In other embodiments, the refractory material may comprise at least 70 wt % yttria, at least 75 wt % yttria, at least 80 wt % yttria, at least 90 wt % yttria, at least 95 wt % yttria, at least 99 wt % yttria, or consist substantially of yttria such as substantially 100% yttria. According to many preferred embodiments, the refractory materials do not include ceramics, oxides, (including compounds and elements) that may be toxic, including but not limited to being radioactive, a carcinogen, or other potentially hazardous substance, such as beryllium and thorium. Toxic materials may include, for example, those materials having an eight hour weight average exposure limit of <2 µg/m$^3$ in air.

In many aspects the inventive refractory materials comprise a substantially monomodal grain structure, or widely distributed grain structure, while in other embodiments, the inventive materials may comprise multimodal grain distributions. In some embodiments, the refractory materials may include (i) at least 20 wt. % of a first grain mode based upon the total weight of the refractory material, the first grain mode having a D50 grain size in the range of from 5 to 2000 µm; and (ii) at least 1 wt. % of second grain mode based upon the total weight of the refractory material, the second grain mode having a D50 grain size in the range of from 0.01 µm up to not greater than one-fourth the D50 grain size of the first grain mode.

In many aspects, the inventive materials may include at least one of yttria, an yttrium containing compound, and combinations thereof. In other embodiments, the materials may comprise one or more of yttria, another yttrium containing compound, a zirconium containing compound, and combinations thereof. Although yttria may be used in some embodiments, the inventive refractory materials include other oxide compounds, either with or without the presence of yttria, which meet the melting point and oxide stability requirements of this invention. Some embodiments may comprise refractory materials that are high in purity or neat content, while other embodiments may either intentionally or incidentally include other elements or compounds. For example, some embodiments may further comprises from 0.001 wt. % to 5 wt. % based upon the weight of the refractory material, of compounds that comprise elements selected from the group consisting of Al, Si, Mg, Ca, Fe, Mn, Ni, Co, Cr, Ti, Hf, V, Nb, Ta, Mo, W, Sc, La, and Ce, and mixtures thereof. In some exemplary pyrolysis reactor applications, the reactor apparatus may comprise a first reactor and a second reactor in flow communication with the first reactor, at least one of the first reactor and the second reactor comprising the refractory material.

In still other aspects, the invention includes a refractory-corrosion-resistant pyrolysis reactor system for pyrolyzing a hydrocarbon feedstock comprising: a first reactor and a second reactor in flow communication with the first reactor, at least one of the first reactor and the second reactor comprising a refractory material in oxide form, having a melting point of no less than 2060° C. and which remains in oxide form when exposed to a gas having a carbon partial pressure of $10^{-11}$ bar, an oxygen partial pressure of $10^{-15}$ bar, and a temperature of 2050° C. In some embodiments, the reactor system the refractory material may be dense, while in other embodiments, the material may comprise porosity at 20° C. in the range of from 2 to 28 vol. % based upon the volume of the refractory material. In still other embodiments, the reactor system further comprises: (i) the first reactor further comprises a first channel for conveying a first reactant through the first reactor and a second channel for conveying a second reactant through the first reactor, the first reactant exothermically reacting with the second reactant to generate heat; (ii) the second reactor is heated by the heat to a temperature of not less than 1200° C., or sometimes no less than 1500° C., or sometimes no less than 1700° C., or sometimes no less than 2000° C., for pyrolyzing a hydrocarbon feedstock in the second reactor, wherein the second reactor comprises the refractory material. In some embodiments, the reactor system may comprise a reverse flow regenerative reactor system, and in others a deferred combustion reverse flow regenerative reactor system.

In many embodiments, the reactor system may include a reactant mixer section intermediate the first reactor and the second reactor to combine at least a portion of the first reactant with at least a portion of the second reactant, the reactant mixer section comprising the refractory material. In some embodiments, the mixer's refractory material includes yttria and/or another yttrium containing compound, the refractory material including a grain structure having a D50 grain size in the range of from 0.01 µm to 2000 µm.

In still other aspects, the invention includes a method for mitigating carbide-oxide ceramic corrosion of a refractory material in the presence of a pyrolyzed hydrocarbon feedstock, the method comprising the steps of providing in a heated region of a pyrolysis reactor system for pyrolyzing a hydrocarbon feedstock, apparatus comprising a refractory material in oxide form, having a melting point of no less than 2060° C. and remains in oxide form when exposed to a gas having a carbon partial pressure of $10^{-11}$ bar, an oxygen partial pressure of $10^{-15}$ bar, at a temperature of 2050° C. In many embodiments, the refractory material has a melting point of at least 2160° C. In some embodiments, the refractory material has a thermodynamic preference to remain in the oxide form when exposed to a gas having a carbon partial pressure of $10^{-10}$ bar, an oxygen partial pressure of $10^{-15}$ bar, and at a temperature over the full range of from 1800° C. to 2100° C. In still other sometimes preferred embodiments, the crystalline structure of the refractory material may be cubic during heat-up from 1250° C. to 2200° C., while in other embodiments the material may be cubic during such cool down. Although cubic form may be sometimes preferred, other structures such as tetragonal may be acceptable according to the invention. In many other embodiments, the vapor pressure of the refractory material is less than $10^{-7}$ bar at 2000° C., or sometimes less than $10^{-8}$ bar at 2000° C.

In yet other aspects, the invention includes a method for pyrolyzing a hydrocarbon feedstock using a pyrolysis reactor system comprising the steps of: (a) providing in a heated region of a pyrolysis reactor system for pyrolyzing a hydrocarbon feedstock, apparatus comprising a refractory material in oxide form, the refractory material having a melting point of not less than 2060° C. and that remains in oxide form when exposed to a gas having a carbon partial pressure of $10^{-11}$ bar, an oxygen partial pressure of $10^{-15}$ bar, at a temperature of 2050° C. In other embodiments, the method may further comprising the steps of: (b) heating the heated region to a temperature of at least 1200° C., or in some embodiments at least 1500° C., or in some embodiments at least 1700° C.; (c) introducing a hydrocarbon feedstock into the heated region; and (d) pyrolyzing the hydrocarbon feedstock using heat from the heated region.

In many embodiments, the pyrolysis reactor apparatus is heated to a temperature of no less than 1200° C., or in other embodiments to no less than 1500° C., or in other embodiments, to no less than 1700° C., and in still other embodiments to no less than 2000° C., while in still other embodiments to a temperature of not greater than 2000° C., and combinations thereof. In other aspects of the invention, the inventive methods include the step of heating the reactor heated region to a temperature of no less than 1200° C., or in other embodiments to no less than 1500° C., or in other embodiments, to no less than 1700° C., in other embodiments to no less than 2000° C., while in still other embodiments to a temperature of not greater than 2000° C., and combinations thereof.

In other embodiments, the method may include the step of heating the heated region to a temperature in a range of from 1500° C. to 2000° C. In many embodiments of the method, the refractory material remains (e.g., has a thermodynamic preference to remain) in the oxide form when exposed to a gas (e.g., a reference gas mixture comprising carbon and oxygen) having a carbon partial pressure of $10^{-10}$ bar, an oxygen partial pressure of $10^{-15}$ bar, and at a temperature over the full range of from 1800° C. to 2100° C. In some embodiments, the refractory material has porosity of from 2 vol. % to 28 vol. %. In still other embodiments, the method may include the step of heating the heated region by deferred combustion. Some embodiments of the inventive methods may also further comprise the steps of: (i) flowing at least one reactant in a first direction through the reactor system; (ii) reacting the at least one reactant within the reactor system to heat the heated region; and (iii) flowing a hydrocarbon feedstock through the heated region to pyrolyze at least a portion of the hydrocarbon feedstock and produce a cracked hydrocarbon product.

According to some embodiments, the step of providing the refractory material comprises providing a refractory material comprising at least 50 wt. % yttria based upon the total weight of the refractory material. In other embodiments of the inventive methods, the step of providing the refractory material comprises providing a refractory material comprising at least 80 wt. % yttria based upon the total weight of the refractory material. In other embodiments, the step of providing the refractory material comprises providing a refractory material comprising at least 90 wt. % yttria based upon the total weight of the refractory material. According to other embodiments of the method, the refractory material comprises a D50 grain size in the range of from 0.01 to 2000 μm. According to still other embodiments of the methods, the vapor pressure of the refractory material is less than $10^{-7}$ bar at 2000° C.

The inventive refractory material may be used in a pyrolysis reactor for pyrolyzing a hydrocarbon feedstock at a temperature of no less than 1200° C., or no less than 1500° C., or no less than 1600° C., or no less than 1700° C., or no less than 2000° C., or up to 2000° C., and intermediate range combinations thereof. The refractory material may be used for any of a wide variety of refractory components, such as but not limited to, spheres, beads, honeycomb materials, a tube, a pipe, a U-tube, a fluid mixer, a nozzle, an extruded monolith, bricks, tiles, catalyst tray, reactor tray, tray component, valves, and/or other refractory components. This list is merely exemplary of some common components used with pyrolysis reactors, and such inventive materials may also be useful with other types of pyrolysis reactors, feeds, and processes.

In one aspect, the invention includes a ceramic refractory material, such as may be useful in a pyrolysis reactor for use in pyrolyzing a carbon-containing feedstock, such as a hydrocarbon feedstock. In many embodiments, the reactor will be a regenerative reactor, in other embodiments a reverse flow type of regenerative reactor. A regenerative reactor is substantially any reactor which is cyclically heated and then reduced in temperature, and then reheated to repeat the process. Direction of flow through the reactor is not critical. A reverse flow regenerative reactor is a pyrolysis reactor or reactor system, whereby fluids flow therein for a period of time in one direction through all or selected portions of the reactor and react or are otherwise processed therein. The direction of flow is then reversed and other materials are fed from the opposite direction through the reactor to displace any remaining first materials or reaction products back in the direction opposite from the original flow. The cycle is then repeated. Thereby, the reactor bed or reactor media components are exposed to materials flowing in each direction through the reactor. For example, heat may be produced or added to the reactor by reactants flowing in one direction and that heat may be used to pyrolyze or otherwise facilitate product-generating reactions in the reactor. A substantial part of the heat is then removed during product flow, often in an opposite direction from the flow direction of the original reactants. The pyrolysis reactor system includes one or more hot or heated regions or reaction zones, and preferably a lower temperature quenching zone that serves to absorb heat from the reacted product to quench the reaction process. After cooling the reaction product, the heated quench zone may be cooled by reversing direction of flow through the reactor and feeding new supply of materials through the quench zone to absorb quench zone heat and carry that heat back to the reaction zone where the recovered heat is conserved and reused to pre-heat the reaction zone and reactant materials. After reaction of the pre-heated reactants, the reactor is "regenerated" and ready to pyrolyze the hydrocarbon reactant material (including any diluents or co-feeds) flowing through the reactor system.

At least a portion of the feedstock transferred to or fed into the reactor system is, generally, (i) pyrolyzed (e.g., cracked) in the reaction zone to form the pyrolysis product (e.g., olefins, aromatics, and/or acetylene), and (ii) that cracked reaction product from (i) is quenched in the quenching zone to stop the reaction at the desired pyrolysis product step to thereby yield the pyrolysis product. If the reaction is not timely quenched and stopped, the reaction may continue decomposing the molecules into coke, elemental components, or other less desirable reaction product components.

Separated but simultaneous introduction of two or more reactants into the reactor system, such as through separate flow channels, can facilitate deferred reaction or combustion of the reactants until they are combined with each other, within the desired reactor zone to react with each other within that designated zone. Thereby, a heat bubble may be controllably and repeatedly positioned within the reactor system. In some embodiments, the reverse flow regenerative reactor may be described as comprising two zones or reactors: (1) a heat recuperating (first) zone/reactor, such as for quenching; and (2) a reforming (second) zone/reactor, such as for pyrolysis reaction and reforming. (The first and second reactors need not necessarily be separate components, but instead may be merely different sections of a common reactor or reactor system. The terms first reactor and second reactor are merely used for simplification and to aid in discussion.) In some embodiments, a reactant mixer may be provided intermediate the first and second reactors to assist with mixing and reacting of the separately introduced reactants. As a catalyst is preferably not required to facilitate reforming the hydrocarbon vapor to acetylene, in most preferred embodiments no catalyst is present in the reactor beds. However, there may be some applications that benefit from the presence of a catalyst within the reactor system to achieve a certain range of reforming performance and such embodiments are within the scope of the invention.

The requisite high temperature for many pyrolysis reactions may be achieved by creating a high-temperature heat bubble in the middle of the reactor system or within one of the reactors of the reactor system, such as in packed or monolithic bed system. This heat bubble may be created via a two-step process wherein heat is (1) added to the reactor bed via delayed or deferred, in-situ combustion, and then (2) removed from the bed via in-situ endothermic reforming. A benefit of the invention is the ability to consistently manage and confine the high temperature bubble (e.g., ≥1200° C., or ≥1500° C.) in a reactor region(s) that comprise the inventive stabilized zirconia and can tolerate such conditions long term. The inventive apparatus and process enable operation of a substantially continuously operating, large-scale, cyclic, commercial regenerative reactor system.

Figure 1B:
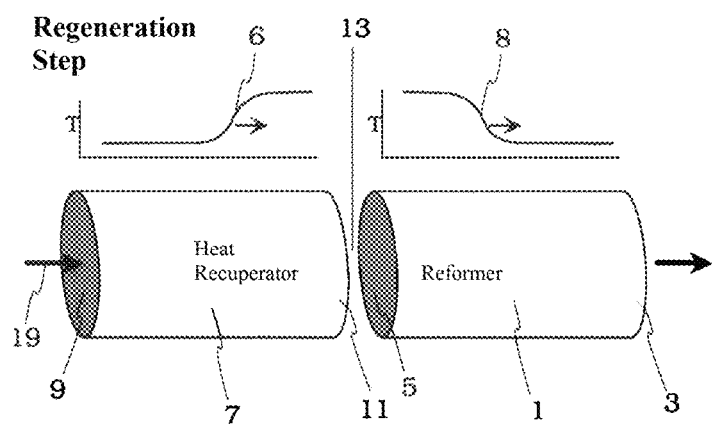

One generalized embodiment of a basic two-step asymmetric cycle regenerative reactor system according to the present invention is depicted in FIGS. 1a and 1b, illustrating a reactor system including two zones/reactors; a first reactor or recuperator/quenching zone (7) and a second reactor or reaction/reforming zone (1). In some embodiments, at least the highest temperature reactor, generally the second reactor, but in other embodiments both of the reactors (7) and (1), that is both the reaction zone (1) and the recuperator zone (7), comprise components fabricated with the inventive refractory material. The inventive material may be provided, for example, in one or more regenerative reactor beds that are useful for carrying out a high temperature chemical reaction. The inventive refractory material may be used in construction of one or more embodiments, components, or regions of the reactor system, and may be of substantially any form or shape, such as but not limited at least one of spheres, beads, honeycomb materials, a tube, pipe, U-tube, fluid mixer, nozzle, extruded monolith, brick, tile, catalyst tray, reactor tray, tray component, valves, and/or other refractory components that are exposed to high temperature. Some embodiments may include the inventive refractory material used in fabrication of at least one of a honeycomb monolith, a reactor bed, a reactor conduit, and a reactant mixer. Additionally, if desired for some embodiments, such as to control costs, a reactor system may also comprise other refractory materials in addition to the inventive materials, in other reactor regions of the reactor that are not exposed to the most severe temperatures, such as glass or ceramic beads or spheres, metal beads or spheres, ceramics (including zirconia), ceramic or metal honeycomb materials, ceramic tubes, extruded monoliths, and the like, provided they are competent to maintain integrity, functionality, and withstand long term exposure to the relevant temperatures for that respective region of the reactor.

During the regeneration step, illustrated in FIG. 1(b), fuel and air may separately be channeled from a first end (19) of the first reactor (7) and then mixed as it exits the second end (11) or enters an optional mixing region (13), which may also include a mixer (not shown). The fuel and air mixture may cool the first reactor (7), producing a temperature gradient profile such as illustrated in graph (6). The mixed components preferably exothermically react (e.g., combust or burn) and the hot reaction product continues to pass into the second end (5) of the second reactor (1) and preferably through the second reactor (1) to exit the first end (3) of the second reactor. The hot reaction product may produce a temperature gradient through the second reactor (1), such as illustrated by graph (8). Then the process reverses (as illustrated in FIG. 1(a)) and one or more pyrolysis reaction feed materials (15) may be fed through the second reactor (1) to pyrolyze the feed, which is then cooled through the optional mixer and through the quenching, first reactor (7). Exemplary temperature profiles are illustrated in graphs (2) and (4).

Figure 2:
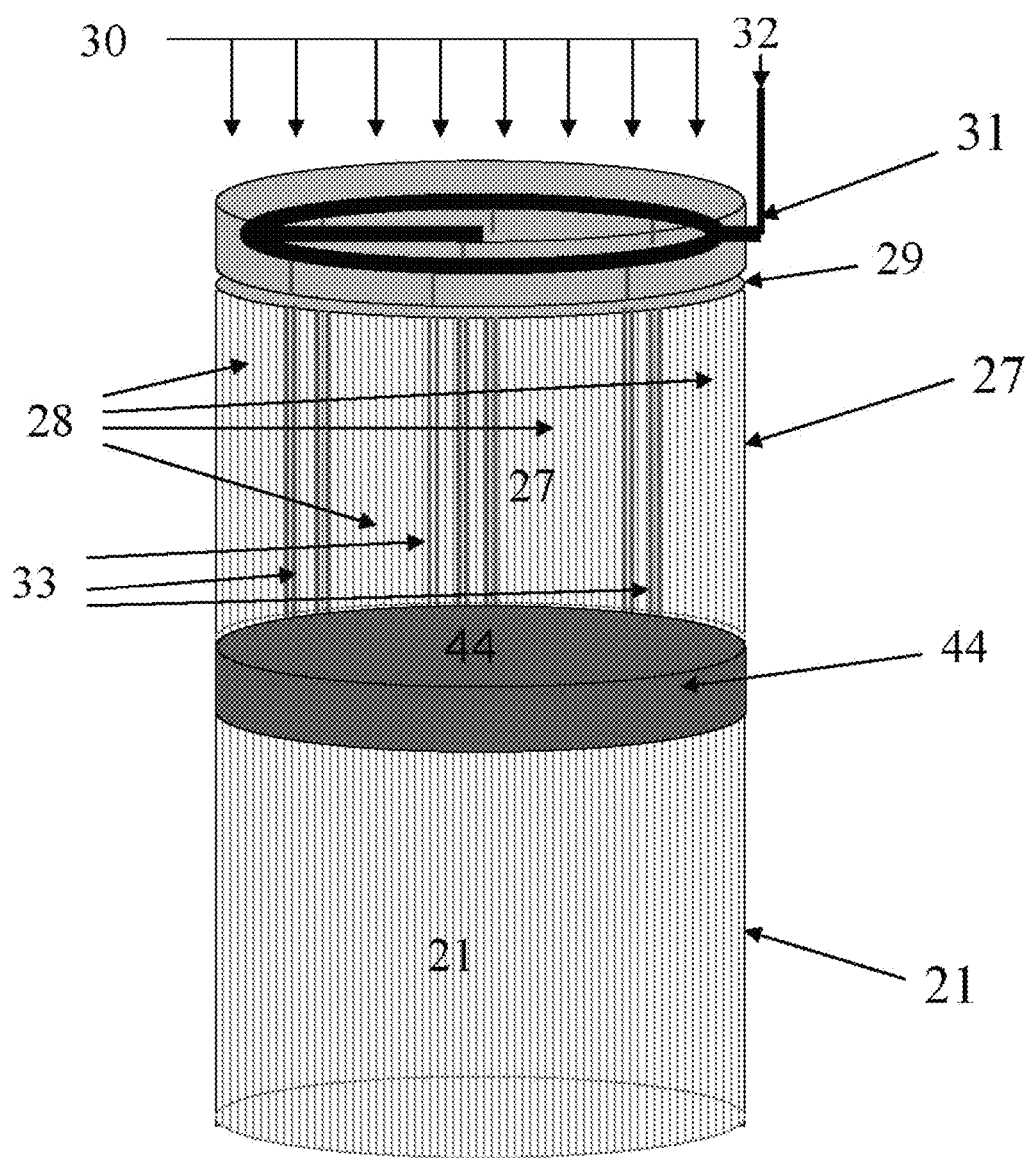
FIG. 2 is another simplified process flow diagram generally illustrating an embodiment of an application of the invention.

FIG. 2 illustrates another simplified, exemplary, reactor system such as may be suitable in some applications for pyrolyzing hydrocarbon feed. The exemplary reactor is described in more detail in U.S. provisional patent application Ser. No. 60/933,044, filed Jun. 4, 2007, the entirety of which is incorporated herein. The reactor system of FIG. 2 is illustrative of any of a wide variety of more specific reactor designs that segregate the conveyance of each of two reactants from each other until the reactants reach a designated zone within the reactor system where they mix and react with each other. Such process and apparatus is particularly useful for deferring the exothermic reaction or combustion of reactants such as fuel and oxidant that provide the heat necessary to heat the pyrolysis zone. The inventive reactor system may utilize inventive material components in all regions of the reactor that may be subjected to the extreme temperatures, such as temperatures in excess of 1200° C., or 1400° C., or 1500° C., or even in excess of 1700° C. In some applications, the inventive material may be useful, for example in applications having temperatures of in excess of 1700° C. and in some other applications the material may be useful in the presence of temperatures in excess of 1800° C., such as up to 2000° C. or up to 2200° C.

FIG. 2 depicts an exemplary reactor system, operating in the heating or "regeneration" heat cycle. The illustrated reactor system comprises two reactors or zones within the system. In the heating cycle, the recuperator reactor (27) serves to separately convey each of reactants (30) and (32) through separate, substantially isolated flow paths or channels (28) and (33) through the reactor without mixing or incurring reaction or combustion until the reactants arrive proximate the reactor core, such as within or near mixer (44). After the reactants combine in or near the mixer (44), exothermic reaction heat is generated, thereby heating the reactor system, preferably to at least 1500° C., and in one embodiment heating particularly the second reactor (21) as the reactants move into and through the second reactor (21). FIG. 2 also illustrates one embodiment of a gas distributor (31) for dispersing one of the two reaction gases to desired locations about the end (29) of the reactor (27), while a separate distributor (30) separately conveys the other reactant into the first reactor (27). In a second or reversed phase of the reaction cycle (not illustrated in FIG. 2, but generally illustrated in FIG. 1(a)), a hydrocarbon feedstock is fed into the heated second reactor (21) (reformer) for pyrolysis of the hydrocarbon feed therein. The heated second reactor (21) is the reactor wherein a majority of the regeneration heating and volatized hydrocarbon reformation or pyrolysis occurs.

Although the first (27) and second reactors (21) in FIG. 2, or (7) and (1) respectively in FIGS. 1(a) and 1(b), in the illustrated reactor system are represented and identified as separately distinguishable reactors, it is understood and within the scope of the present invention that the first and second reactors may be manufactured, provided, or otherwise combined or integrated into a common single reactor system or facility, whereby the reactor system might be described as comprising merely a single reactor facility that integrates substantially the full extent of both reactors and reactor cycles within the reactor system. The terms "first reactor" and "second reactor" are utilized for simplified explanation purposes and merely refer to the respective zones within the reactor system whereby each of the regeneration, reformation, quenching, etc., steps take place and do not require that separate reactors or components actually be utilized for the two reactors. Many embodiments will comprise a reactor system whereby the recuperator reactor includes conduits and channels as described herein, preferably formed from the inventive material to accommodate high temperature quenching. The reformer reactor is preferably also fabricated using the inventive material. A reactant mixer (44) may be provided intermediate the first and second reactors to facilitate good stoichiometric reaction and even heating. Other embodiments may include a reformer reactor bed that is arranged different from the recuperator bed. In some other embodiments, the reformer bed may comprise inventive materials that are different from the inventive materials that comprise the recuperator bed. Routine experimentation and knowledge of the volatized hydrocarbon pyrolysis art may be used to determine an effective reformer/second reactor design.

In a preferred embodiment of the present invention, a first reactant, such as a hydrocarbon fuel, is directed down one or more designated channels or conduits, while a second reactant, such as an oxygen-containing gas, is simultaneously directed down one or more other designated channels, through the reactor. During flow in the opposite direction, preferably both of the first and second sets of channels are simultaneously utilized to convey the pyrolyzed and likely expanded product volume through the recuperator reactor. In one embodiment, the channels are included in one or more honeycomb monolith type structures. The term "honeycomb monoliths" is defined broadly to include but not be limited to extruded, ceramic structures as are generally known in the reaction industry, such as in catalytic converters, etc., capable of conveying a fluid through the framework of channels. The term "honeycomb" is also used broadly herein to refer to any framework of channels, regardless of cross-sectional geometry, that includes multiple substantially parallel flow paths or channels and is not intended to limit the structure or shape to any particular geometric shape. The channels each may have generally any cross-sectional shape, although a generally symmetrical cross-sectional shape may be preferred. Each monolith may include a single channel, a few channels, or multiple channels, e.g., tens, hundreds, or even thousands of channels, depending upon the size of the particular monoliths and reactors utilized therein. For example, in one embodiment, the conduits may have a diameter of only a few millimeters, or about one millimeter, or several millimeters and even several centimeters in diameter in some vessels. A reactor may comprise a single, a few, or even numerous monoliths. The monoliths may be further arranged into cells or groups of monoliths, wherein each cell or a group of cells is dedicated to conducting one of the two simultaneously conveyed materials, while another group of cells conveys the other material. A preferred monolith arrangement will provide low pressure loss or drop during reactant or product transference, while providing necessary product contact time and heat transfer during conductance. The arrangement preferably also provides adequate mixing of the conveyed materials after exiting the monoliths, such as in or near the reaction zone. In addition to providing a flow conduit, the channels also facilitate effective material isolation barriers (e.g., function such as conduit walls) to prevent cross flow or mixing between the first and second reactants and maintain a majority of the reactants effectively separated from each other until mixing is permitted. In some preferred embodiments of the present invention, the reactors are comprised of one or more extruded honeycomb monoliths.

In some embodiments, the inventive materials and components preferably provide a conduit packing with an average wetted surface area per unit volume that ranges from about 50 ft$^{-1}$ to about 3000 ft$^{-1}$, more preferably from about 100 ft$^{-1}$ to 2500 ft$^{-1}$, and still more preferably from about 200 ft$^{-1}$ to 2000 ft$^{-1}$, based upon the volume of the first reactor that is used to convey a reactant. Such wetted area values apply to the channels for both of the first and second reactants, with relatively thin walls separating the channels to facilitate good heat transfer between the reactants and the inventive material. The term "thin walls" refers to the distance through which heat should be moved within the solid portions of the component. Thus, for a bed of spherical packing would simply be the sphere diameter. For a reactor bed comprising honeycomb monolith structures, the relevant dimension is simply the wall thickness separating the flow channels. Exemplary wall thickness of some honeycomb monoliths according to the present invention is less than 2.5 mm, frequently less than 1.0 mm, down to a probable minimum wall thickness of not less than around 0.1 mm. These relatively thin walls are enabled by the strength and thermal shock resistance properties of the inventive material, as discussed previously herein and in related patent applications. The durable, stable, corrosion resistant and heat resistant material is ideal at enabling use of thin but strong reactor channel or wall components. The relatively high density also helps mitigate reactant cross-flow through the conduit or channel walls. The relatively high surface area per unit volume values facilitated by the high number of relatively small reactant channel or conduits are likely preferred for many embodiments to aid achieving a relatively quick change in the temperature through the reactor, such as generally illustrated by the relatively steep slopes in the exemplary temperature gradient profile graphs, such as in FIGS. 1(*a*), and 1(*b*). The quick temperature change is preferred to permit relatively quick and consistent heating and quenching of the reaction to prevent the reaction from continuing and creating coke. The relatively high thermal stability, high thermal shock resistance, and high heat transfer capability of stabilized zirconia also enables these desired quick temperature changes, without experiencing material failure due to thermal shock degradation. The prescribed zirconia is highly resistant to such degradation and to ceramic corrosion.

In some embodiments, a reactor will provide media channels and other high temperature-exposed components and packing that includes a high volumetric heat transfer coefficient (e.g., greater than or equal to 0.02 cal/cm$^3$s° C., preferably greater than about 0.05 cal/cm$^3$s° C., and most preferably greater than 0.10 cal/cm$^3$s° C.), with corresponding low resistance to flow (low pressure drop), have operating temperature range consistent with the highest temperatures encountered during regeneration, have high resistance to thermal shock, and have high bulk heat capacity (e.g., at least about 0.10 cal/cm$^{3\circ}$ C., and preferably greater than about 0.20 cal/cm$^{3\circ}$ C.). As with the high surface area values, these relatively high volumetric heat transfer coefficient values, high strength (MOR), and other properties provided by the inventive stabilized zirconia are also likely preferred for many embodiments to aid in achieving a relatively quick change in the temperature through the reactor, such as generally illustrated by the relatively steep slopes in the exemplary temperature gradient profile graphs, such as in FIGS. 1(*a*), 1(*b*), and 6. The quick temperature change permits relatively quick and consistent quenching of the reaction to prevent the reaction from continuing too long and creating coke or carbon buildup.

Some embodiments may use the inventive materials and components for uses other than the described and often preferred honeycomb monoliths, such as whereby the channel conduits/flow paths are substantially linear and tubular. Other alternative embodiments may include more tortuous pathways (e.g. convoluted, complex, winding and/or twisted but not linear or tubular) through a component, than the previously described monoliths, including but not limited to labyrinthine, variegated flow paths, conduits, tubes, slots, and/or a void structure having channels through a portion(s) of the reactor and may include barrier portion, such as along an outer surface of a segment or within sub-segments, having substantially no effective permeability to gases, and/or other means suitable for preventing cross flow between the reactant gases and maintaining the first and second reactant gases substantially separated from each other while axially transiting the recuperator (27). For such embodiments, the complex flow path may create a lengthened effective flow path, increased surface area, and improved heat transfer. Such design may be preferred for reactor embodiments having a relatively short axial length through the reactor. Axially longer reactor lengths may experience increased pressure drops through the reactor. However for such embodiments, the porous and/or permeable media may include, for example, at least one of a packed bed, an arrangement of tiles, a permeable solid media, a substantially honeycomb-type structure, a fibrous arrangement, and a mesh-type lattice structure. It may often be preferred that the zirconia matrix provides high surface area to facilitate good heat exchange with the reactant and produced gases.

Typical conditions may include a residence time from 0.001 to 1.0 seconds and may typically include, for example, a pressure from about 5 to 50 psia (34 to 345 kPa). In some embodiments, the reactor conditions may be at a vacuum pressure, such as less than 15 psia (103 kPa). For purposes of this discussion, the term "residency time" refers to the time exposed to temperatures typically in excess of about 1200° C. For example, in many useful reactors, the residency time at such temperature, and more preferably at temperatures in excess of 1500° C., is preferably less than about 0.005 seconds, such as within a range of from 0.001 to 0.010 seconds, but more preferably within a range of from 0.001 to about 0.005 seconds. However, the total time in the reactor bed system could be longer, such as on order of 0.030 seconds or greater, depending upon the quenching process and reactor channel length. Cracked pyrolysis product may be removed from the reactor system, such as via lines 49 and/or 51 and transferred to other processes for recovery of the various component products of the cracked product. The reactor system may also include additional feed lines (not shown) such as fuel and oxidant feed, stripping agent feed, exhaust lines, etc.

The regenerative pyrolysis reactor system may heat the hydrocarbon feedstock to temperatures in excess of 1200° C., preferably in excess of 1500° C., more preferably in excess of 1700° C. In some reactions, it may even be preferable to heat the feeds for very short time duration, such as less than 0.1 seconds, to a temperature in excess of 1800° C. or even in some instances in excess of 2000° C. An exemplary preferred process may pyrolyze the feed stream within the reactor, such as at temperatures of from 1500° C. to 2000° C., or from 1500° C. to 1900° C., and sometimes preferably from 1600° C. to 1700° C. Exemplary residency times preferably may be short, such as less than 0.1 seconds and preferably less than 5 milliseconds. In some aspects, the conversion or cracking of the separated vapor phase may be performed in the presence of hydrogen, hydride, other hydrocarbons, and/or other diluents or stripping agents. The conversion of the vapor fraction into higher value hydrocarbons such as acetylene typically requires a high reformation temperature, which in the past has been a significant barrier to commercialization and efficiency.

In one preferred embodiment, the reactor component providing conduits or channels comprise stabilized zirconia materials that provide the necessary heat transfer capacity to create the temperature profiles (4) and (8) illustrated in FIG. 1, at the space velocity conditions of operation. Adequate heat transfer rate is characterized by a heat transfer parameter $\Delta T_{HT}$, below about 500° C., more preferably below about 100° C., and most preferably below about 50° C. The parameter $\Delta T_{HT}$, as used herein, is the ratio of the bed-average volumetric heat transfer rate that is needed for recuperation, to the volumetric heat transfer coefficient of the bed, $h_v$. The volumetric heat transfer rate (e.g. cal/cm³ sec) that is sufficient for recuperation is calculated as the product of the gas flow rate (e.g. gm/sec) with the gas heat capacity (e.g. ca./μm ° C.) and desired end-to-end temperature change (excluding any reaction, e.g. ° C.), and then this quantity divided by the volume (e.g. cm³) of the recuperator zone (27) traversed by the gas. The $\Delta T_{HT}$ in channel (28) is computed using gas (30), channel (33) with gas (32), and total recuperator zone (27) with total gas. The volumetric heat transfer coefficient of the bed, $h_v$, is typically calculated as the product of a area-based coefficient (e.g. cal/cm²s° C.) and a specific surface area for heat transfer ($a_v$, e.g. cm²/cm³), often referred to as the wetted area of the packing.

Typical conditions may include a residence time of from 0.001 to 1.0 seconds and may typically include, for example, a pressure from about 5 to 50 psia (34 to 345 kPa). In some embodiments, the reactor conditions may be near atmospheric pressure, such as from about 13 to about 25 psia (90 to 172 kPa), and in other embodiments at a vacuum pressure, such as less than 15 psia (103 kPa). Cracked pyrolysis product may be removed from the reactor system and transferred to other processes for recovery of the various component products of the cracked product. In addition to the hydrocarbon feed to be cracked, the reactor system may also include additional feeds, such as fuel, oxidant, steam, hydrogen, or other hydrocarbon co-reactants, or other co-feeds. In some aspects, the conversion or cracking of the hydrocarbon feed may be performed in the presence of hydrogen, hydrides, other hydrocarbons, and/or other diluents or stripping agents.

In another embodiment, the present techniques relate to:
1. A reactor apparatus for pyrolyzing a hydrocarbon feedstock, the apparatus including:
   a reactor component comprising a refractory material in oxide form, the refractory material having a melting point of no less than 2060° C. and which remains in oxide form for at least one of
   i) when exposed to a gas having an oxygen partial pressure of $10^{-15}$ bar, a carbon partial pressure above the carbon partial pressure of the zirconium carbide and zirconium oxide phase transition at the same temperature, and at temperatures below the temperature of the zirconium triple point at the oxygen partial pressure of $10^{-15}$ bar;
   ii) when exposed to a gas having an oxygen partial pressure of $10^{-15}$ bar and at temperatures above the zirconium triple point at the oxygen partial pressure of $10^{-15}$ bar.
2. The apparatus of paragraph 1, wherein the refractory material is in oxide form when exposed to a gas having an oxygen partial pressure of $10^{-15}$ bar, a carbon partial pressure above the carbon partial pressure of the zirconium carbide and zirconium phase transition at the same temperature, and at temperatures above the zirconium triple point at the oxygen partial pressure of $10^{-15}$ bar.
3. The apparatus of paragraph 1, wherein the refractory material remains in oxide form when exposed to a gas having carbon partial pressure of $10^{-11}$ bar, an oxygen partial pressure of $10^{-15}$ bar, at a temperature of 2050° C.
4. The apparatus of any of the preceding paragraphs, wherein the reactor apparatus comprises a thermal pyrolysis reactor apparatus.

5. The apparatus of paragraph 4, wherein the thermal pyrolysis reactor apparatus comprises a reverse flow regenerative reactor apparatus.

6. The apparatus of any of the preceding paragraphs, wherein the refractory material has a melting point of no less than 2160° C.

7. The apparatus of paragraph 1, wherein the refractory material remains in the oxide form when exposed to a reference pyrolysis gas mixture having a carbon partial pressure of $10^{-10}$ bar, an oxygen partial pressure of $10^{-15}$ bar, and at a temperature over the full range of from 1800° C. to 2100° C.

8. The apparatus of any of the preceding paragraphs, wherein the crystalline structure of the refractory material is cubic during heat-up from 1250° C. to 2250° C.

9. The apparatus of any of the preceding paragraphs, wherein the crystalline structure of the refractory material is cubic during cool-down from 2250° C. to 1250° C.

10. The apparatus of any of the preceding paragraphs, wherein the vapor pressure of the refractory material is less than $10^{-7}$ bar at 2000° C.

11. The apparatus of any of the preceding paragraphs, wherein the reactor component includes at least one of flow channels, a reaction fluid mixer, and a reaction heat sink member.

12. The apparatus of any of the preceding paragraphs, wherein the reactor component comprises a honeycomb monolith having flow channels within the monolith for conducting at least one of a pyrolysis reactant and a pyrolysis product through the monolith.

13. The apparatus of any of the preceding paragraphs, wherein the reactor component has a thermal shock resistance rating that demonstrates a total crack length per unit area after quenching the reactor component from 1100° C. into a water bath to a temperature of 50° C. is not greater than 30 cm/cm$^2$.

14. The apparatus of any of the preceding paragraphs, wherein the reactor component comprises a modulus of rupture mechanical flexural strength of not less than 13.8 MPa at a temperature in a range of from 1000° C. to 2000° C.

15. The apparatus of any of the preceding paragraphs, wherein the refractory material has porosity at 20° C. in the range of from 2 to 28 vol. % based upon the volume of the refractory material.

16. The apparatus of any of the preceding paragraphs, comprising at least 50 wt. % yttrium oxide (yttria) based upon the total weight of the refractory material.

17. The apparatus of any of the preceding paragraphs, comprising at least 80 wt. % yttria based upon the total weight of the refractory material.

18. The apparatus of any of the preceding paragraphs, wherein the refractory material comprises at least a first grain mode comprising yttria and a second grain mode comprising yttria.

19. The apparatus of any of the preceding paragraphs, wherein the refractory materials substantially exclude oxides of toxic ceramics.

20. The apparatus of paragraph 19, wherein the oxides of toxic ceramics include beryllium and thorium.

21. The apparatus of any of the preceding paragraphs, wherein the refractory material comprises;
   (i) at least 20 wt. % of a first grain mode based upon the total weight of the refractory material, the first grain mode having a D50 grain size in the range of from 5 to 2000 μm; and
   (ii) at least 1 wt. % of second grain mode based upon the total weight of the refractory material, the second grain mode having a D50 grain size in the range of from 0.01 μm up to not greater than one-fourth the D50 grain size of the first grain mode.

22. The apparatus of paragraph 1, wherein the refractory material comprises at least one of yttria, an yttrium containing compound, and combinations thereof.

23. The apparatus of paragraph 1, wherein the refractory material comprises at least one of yttria, another yttrium containing compound, a zirconium containing compound, and combinations thereof.

24. The apparatus of paragraph 23, wherein the refractory material further comprises from 0.001 wt. % to 5 wt. % based upon the weight of the refractory material, of compounds that comprise elements selected from the group consisting of Al, Si, Mg, Ca, Fe, Mn, Ni, Co, Cr, Ti, Hf, V, Nb, Ta, Mo, W, Sc, La, and Ce, and mixtures thereof.

25. The apparatus of any of the preceding paragraphs used in a pyrolysis reactor for pyrolyzing a hydrocarbon feedstock, at a temperature of no less than 1200° C.

26. The apparatus of any of the preceding paragraphs used in a pyrolysis reactor for pyrolyzing a hydrocarbon feedstock, at a temperature of no less than 1500° C.

27. The apparatus of any of the preceding paragraphs used in a pyrolysis reactor for pyrolyzing a hydrocarbon feedstock, at a temperature of no less than 2000° C.

28. The apparatus of any of the preceding paragraphs, wherein the reactor component includes at least one of a honeycomb monolith, a reactor bed, a reactor conduit, and a reactant mixer.

29. The apparatus of any of the preceding paragraphs, wherein the regenerative pyrolysis reactor comprises at least one of a deferred combustion reactor, gasification reactor, syngas reactor, steam cracking reactor, and fired furnace.

30. The apparatus of any of the preceding paragraphs, further comprising a first reactor and a second reactor in flow communication with the first reactor, at least one of the first reactor and the second reactor comprising the refractory material.

31. A regenerative, refractory corrosion resistant, pyrolysis reactor system for pyrolyzing a hydrocarbon feedstock comprising:
   a first reactor and a second reactor in flow communication with the first reactor, at least one of the first reactor and the second reactor comprising a refractory material in oxide form, the refractory material having a melting point of not less than 2060° C. and which remains in oxide form for at least one of
   i) when exposed to a gas having an oxygen partial pressure of $10^{-15}$ bar, a carbon partial pressure above the carbon partial pressure of the zirconium carbide and zirconium oxide phase transition at the same temperature, and at temperatures below the temperature of the zirconium triple point at the oxygen partial pressure of $10^{-15}$ bar; and
   ii) when exposed to a gas having an oxygen partial pressure of $10^{-15}$ bar and at temperatures above the zirconium triple point at the oxygen partial pressure of $10^{-15}$ bar.

32. The reactor system of paragraph 31, wherein the refractory material remains in oxide form when exposed to a gas having a carbon partial pressure of $10^{-11}$ bar, a reference oxygen partial pressure of $10^{-15}$ bar, and a temperature of 2050° C.

33. The reactor system of paragraphs 31 and 32, wherein the refractory material has porosity at 20° C. in the range of from 2 to 28 vol. % based upon the volume of the refractory material.

34. The reactor system of paragraphs 31, 32 and 33, wherein the reactor system further comprises:
 (i) the first reactor further comprises a first channel for conveying a first reactant through the first reactor and a second channel for conveying a second reactant through the first reactor, the first reactant exothermically reacting with the second reactant to generate heat;
 (ii) the second reactor is heated by the heat to a temperature of at least 1500° C. for pyrolyzing a hydrocarbon feedstock in the second reactor, wherein the second reactor comprises the refractory material.

35. The reactor system of any of the paragraphs 31 to 34, wherein the reactor system comprises a reverse flow regenerative reactor system.

36. The reactor system of any of the paragraphs 31 to 35, further comprising a reactant mixer section intermediate the first reactor and the second reactor to combine at least a portion of the first reactant with at least a portion of the second reactant, the reactant mixer section comprising the refractory material.

37. The reactor system of any of the paragraphs 31 to 36, wherein the refractory material includes yttria and/or another yttrium containing compound, the refractory material including a grain structure having a D50 grain size in the range of from 0.01 μm to 2000 μm.

38. A method for mitigating carbide-oxide ceramic corrosion of a refractory material in the presence of a pyrolyzed hydrocarbon feedstock, the method comprising the steps of providing in a heated region of a pyrolysis reactor system for pyrolyzing a hydrocarbon feedstock, apparatus comprising a refractory material in oxide form, the refractory material having a melting point of not less than 2060° C. and that remains in oxide form for at least one of
i) when exposed to a gas having an oxygen partial pressure of $10^{-15}$ bar, a carbon partial pressure above the carbon partial pressure of the zirconium carbide and zirconium oxide phase transition at the same temperature, and at temperatures below the temperature of the zirconium triple point at the oxygen partial pressure of $10^{-15}$ bar; and
ii) when exposed to a gas having an oxygen partial pressure of $10^{-15}$ bar and at temperatures above the zirconium triple point at the oxygen partial pressure of $10^{-15}$ bar.

39. The method of paragraph 38, wherein the refractory material remains in oxide form when exposed to a gas having a carbon partial pressure of $10^{-11}$ bar, an oxygen partial pressure of $10^{-15}$ bar, at a temperature of 2050° C.

40. The method of any of the paragraphs 38 to 39, wherein the refractory material has a melting point of no less than 2160° C.

41. The method of paragraph 38, wherein the refractory material remains in the oxide form when exposed to a gas having a carbon partial pressure of $10^{-10}$ bar, an oxygen partial pressure of $10^{-15}$ bar, and at a temperature over the full range of from 1800° C. to 2100° C.

42. The method of any of the paragraphs 38 to 41, wherein the crystalline structure of the refractory material is cubic during heat-up from 1250° C. to 2200° C.

43. The method of any of the paragraphs 38 to 42, wherein the vapor pressure of the refractory material is less than $10^{-7}$ bar at 2000° C.

44. A method for pyrolyzing a hydrocarbon feedstock using a pyrolysis reactor system comprising the steps of:
 (a) providing in a heated region of a pyrolysis reactor system for pyrolyzing a hydrocarbon feedstock, apparatus comprising a refractory material in oxide form, the refractory material having a melting point of not less than 2060° C. and that remains in oxide form for at least one of
i) when exposed to a gas having an oxygen partial pressure of $10^{-15}$ bar, a carbon partial pressure above the carbon partial pressure of the zirconium carbide and zirconium oxide phase transition at the same temperature, and at temperatures below the temperature of the zirconium triple point at the oxygen partial pressure of $10^{-15}$ bar;
ii) when exposed to a gas having an oxygen partial pressure of $10^{-15}$ bar and at temperatures above the zirconium triple point at the oxygen partial pressure of $10^{-15}$ bar.

45. The method of paragraph 44, wherein the refractory material remains in oxide form when exposed to a gas having a carbon partial pressure of $10^{-11}$ bar, an oxygen partial pressure of $10^{-15}$ bar, at a temperature of 2050° C.

46. The method of any of the paragraphs 44 to 45, further comprising the steps of:
 (b) heating the heated region to a temperature of no less than 1200° C.;
 (c) introducing a hydrocarbon feedstock into the heated region; and
 (d) pyrolyzing the hydrocarbon feedstock using heat from the heated region.

47. The method of any of the paragraphs 44 to 46, further comprising the step of heating the heated region to a temperature in a range of from 1500° C. to 2000° C.

48. The method of paragraph 44, wherein the refractory material remains in the oxide form when exposed to a gas having a carbon partial pressure of $10^{-10}$ bar, an oxygen partial pressure of $10^{-15}$ bar, and at a temperature over the full range of from 1800° C. to 2100° C.

49. The method of any of the paragraphs 44 to 49, wherein the refractory material has porosity of from 2 vol. % to 28 vol. %.

50. The method of any of the paragraphs 44 to 49, further comprising the step of heating the heated region by deferred combustion.

51. The method of any of the paragraphs 44 to 50, further comprising the steps of:
 (i) flowing at least one reactant in a first direction through the reactor system;
 (ii) reacting the at least one reactant within the reactor system to heat the heated region; and
 (iii) flowing a hydrocarbon feedstock through the heated region to pyrolyze at least a portion of the hydrocarbon feedstock and produce a cracked hydrocarbon product.

52. The method of any of the paragraphs 44 to 51, wherein the step (a) of providing the refractory material comprises providing a refractory material comprising at least 50 wt. % yttria based upon the total weight of the refractory material.

53. The method of any of the paragraphs 44 to 52, wherein the step (a) of providing the refractory material comprises providing a refractory material comprising at least 80 wt. % yttria based upon the total weight of the refractory material.

54. The method of any of the paragraphs 44 to 53, wherein the step (a) of providing the refractory material comprises providing a refractory material comprising at least 90 wt. % yttria based upon the total weight of the refractory material.

55. The method of any of the paragraphs 44 to 54, wherein the refractory material comprises a D50 grain size in the range of from 0.01 to 2000 μm.

56. The method of paragraph 44, wherein the vapor pressure of the refractory material is no greater than $10^{-7}$ bar at 2000° C.

While the present invention has been described and illustrated with respect to certain embodiments, it is to be understood that the invention is not limited to the particulars disclosed and extends to all equivalents within the scope of the claims. Unless otherwise stated, all percentages, parts, ratios, etc. are by weight. Unless otherwise stated, a reference to a compound or component includes the compound or component by itself as well as in combination with other elements, compounds, or components, such as mixtures of compounds. Further, when an amount, concentration, or other value or parameter is given as a list of upper preferable values and lower preferable values, this is to be understood as specifically disclosing all ranges formed from any pair of an upper preferred value and a lower preferred value, regardless of whether ranges are separately disclosed.

What is claimed is:

1. A method for pyrolyzing a hydrocarbon feedstock using a pyrolysis reactor system comprising the steps of:
    (A) heating a region of the pyrolysis reactor system, the region including at least one refractory material in oxide form, and the region being heated by flowing at least one reactant in a first direction through the reactor system and reacting the at least one reactant within the reactor system;
    wherein the refractory material has a melting point of no less than 2060° C.;
    wherein the refractory material remains in oxide form during at least one of the following two scenarios:
        i) when the refractory material is exposed to both (a) a first temperature in the presence of a gas having an oxygen partial pressure of $10^{-15}$ bar and a carbon partial pressure above that exhibited by zirconium carbide at the zirconium carbide's phase transition to zirconium oxide at the first temperature, and (b) a second temperature in the presence of a gas having an oxygen partial pressure of $10^{-15}$, the second temperature being below that of zirconium's triple point; and
        ii) when exposed to a temperature in the presence of a gas having an oxygen partial pressure of $10^{-15}$ bar, the temperature being above that of zirconium's triple point; and
    wherein the refractory material includes
        (i) at least 20 wt. % of a first grain mode based upon the total weight of the refractory material, the first grain mode comprising yttria and having a D50 grain size in the range of from 5 to 2000 μm; and
        (ii) at least 1 wt. % of a second grain mode based upon the total weight of the refractory material, the second grain mode comprising yttria and having a D50 grain size in the range of from 0.01 μm up to not greater than one-fourth the D50 grain size of the first grain mode;
    (B) introducing a hydrocarbon feedstock into the heated region; and
    (C) pyrolyzing the hydrocarbon feedstock using heat from the heated region.

2. The method of claim 1, wherein the refractory material remains in oxide form when exposed to a gas having a carbon partial pressure of $10^{-11}$ bar, an oxygen partial pressure of $10^{-15}$ bar, at a temperature of 2050° C.

3. The method of claim 1, wherein,
    during step (A) the heated region is heated to a temperature of no less than 1200° C.

4. The method of claim 1, wherein the refractory material remains in the oxide form when exposed to a gas having a carbon partial pressure of $10^{-10}$ bar, an oxygen partial pressure of $10^{-15}$ bar, and at a temperature over the full range of from 1800° C. to 2100° C.

5. The method of claim 1, wherein the refractory material comprises 80 wt.% yttria based upon the total weight of the refractory material.

6. The method of claim 1, wherein the refractory material comprises 90 wt.% yttria based upon the total weight of the refractory material.

* * * * *